(12) United States Patent
Durand et al.

(10) Patent No.: US 12,198,098 B2
(45) Date of Patent: Jan. 14, 2025

(54) SYSTEMS AND METHODS FOR REMOTELY MONITORING INVENTORY AND PRODUCT LIFE-CYCLE

(71) Applicant: Roth River, Inc., Louisville, KY (US)

(72) Inventors: David Durand, Louisville, KY (US); Todd Pritts, Louisville, KY (US); Jeffrey Thomas Cesnik, Winchester, VA (US)

(73) Assignee: Roth River, Inc., Louisville, KY (US)

( * ) Notice: Subject to any disclaimer, the term of this patent is extended or adjusted under 35 U.S.C. 154(b) by 155 days.

(21) Appl. No.: 17/711,832

(22) Filed: Apr. 1, 2022

(65) Prior Publication Data

US 2022/0230130 A1      Jul. 21, 2022

Related U.S. Application Data

(63) Continuation of application No. PCT/US2020/054998, filed on Oct. 9, 2020.

(60) Provisional application No. 62/912,934, filed on Oct. 9, 2019.

(51) Int. Cl.
*G06Q 10/087* (2023.01)
*H04L 67/025* (2022.01)
*H04L 67/12* (2022.01)

(52) U.S. Cl.
CPC ......... *G06Q 10/087* (2013.01); *H04L 67/025* (2013.01); *H04L 67/12* (2013.01)

(58) Field of Classification Search
CPC .............. G06Q 10/087; G06Q 30/0201; H04L 67/025; H04L 67/12; G01F 22/00; G01F 23/265; G16Y 20/10; H04Q 2209/43; H04Q 9/00
See application file for complete search history.

(56) References Cited

U.S. PATENT DOCUMENTS

| | | | |
|---|---|---|---|
| 10,143,038 B1 | 11/2018 | Stamatakis | |
| 2002/0029272 A1* | 3/2002 | Weller | G06Q 10/06 709/226 |
| 2003/0126020 A1* | 7/2003 | Smith | G06Q 30/02 705/16 |
| 2005/0225441 A1* | 10/2005 | Kernan | H04L 12/66 340/506 |

(Continued)

FOREIGN PATENT DOCUMENTS

| | | |
|---|---|---|
| JP | 2007303982 A | 11/2007 |
| JP | 2010079560 A | 4/2010 |

OTHER PUBLICATIONS

Cañete, E., Chen, J., Martín, C., & Rubio, B. (2018). Smart winery: A real-time monitoring system for structural health and ullage in fino style wine casks. Sensors, 18(3), 803. doi:https://doi.org/10.3390/s18030803 (Year: 2018).*

(Continued)

*Primary Examiner* — Ashford S Hayles
(74) *Attorney, Agent, or Firm* — Frost Brown Todd LLP

(57) ABSTRACT

A remote monitoring system for monitoring inventory, process, and product life-cycle data is disclosed. Data may be collected from the remote monitoring system. The data can include information on raw material components, source information, production or storage location and movement, production or storage temperature, production or storage barometric pressure, packaging, distribution, sales, or combinations thereof.

26 Claims, 37 Drawing Sheets

(56) References Cited

U.S. PATENT DOCUMENTS

| | | | | |
|---|---|---|---|---|
| 2006/0113374 A1* | 6/2006 | Taylor | ................ | G06Q 10/087 235/375 |
| 2006/0176169 A1 | 8/2006 | Doolin et al. | | |
| 2006/0224432 A1* | 10/2006 | Li | ................ | G06Q 10/1095 705/7.19 |
| 2008/0272923 A1* | 11/2008 | Breed | ................ | G06F 3/0233 340/632 |
| 2009/0136885 A1* | 5/2009 | Manno | ................ | B27H 5/08 432/232 |
| 2010/0076872 A1 | 3/2010 | Nakamura | | |
| 2012/0008830 A1* | 1/2012 | Yoshii | ................ | G06T 7/74 382/103 |
| 2012/0095585 A1* | 4/2012 | Agarwal | ................ | G06Q 10/103 700/109 |
| 2012/0226624 A1* | 9/2012 | Song | ................ | G06Q 10/083 705/338 |
| 2013/0181829 A1* | 7/2013 | Schnitz | ................ | G01F 23/80 340/539.1 |
| 2013/0314244 A1* | 11/2013 | Hershberger | ................ | G01G 17/04 340/870.02 |
| 2014/0039816 A1* | 2/2014 | Van Bekkum | ................ | B65D 90/48 702/50 |
| 2015/0030219 A1* | 1/2015 | Madabhushi | ................ | G06T 7/12 382/128 |
| 2015/0192475 A1* | 7/2015 | Eisenstadt | ................ | H04Q 9/00 340/870.01 |
| 2015/0253174 A1* | 9/2015 | Barrett | ................ | G01F 23/0007 73/304 C |
| 2015/0287313 A1* | 10/2015 | Silvers | ................ | G01F 23/683 340/618 |
| 2016/0264394 A1* | 9/2016 | Hershberger | ................ | B67D 1/0888 |
| 2017/0297890 A1* | 10/2017 | Herlin | ................ | B67D 1/0878 |
| 2017/0314981 A1 | 11/2017 | Flockenhaus et al. | | |
| 2017/0337535 A1* | 11/2017 | Jones | ................ | H04L 67/52 |
| 2017/0369245 A1* | 12/2017 | Suemitsu | ................ | B65G 1/1373 |
| 2018/0025460 A1* | 1/2018 | Watanabe | ................ | G06Q 10/087 705/28 |
| 2018/0032948 A1* | 2/2018 | Alvarez | ................ | C12L 11/00 |
| 2018/0158016 A1* | 6/2018 | Pandya | ................ | G05B 19/41895 |
| 2018/0188099 A1* | 7/2018 | McCoy | ................ | G01F 23/2962 |
| 2018/0365964 A1* | 12/2018 | Carson | ................ | G01K 1/022 |
| 2019/0025108 A1* | 1/2019 | Jones | ................ | G01F 23/18 |
| 2019/0026511 A1* | 1/2019 | Whittington | ................ | G06K 7/1413 |
| 2019/0108396 A1* | 4/2019 | Dal Mutto | ................ | G06V 20/52 |
| 2019/0166648 A1 | 5/2019 | Stamatakis | | |
| 2019/0186977 A1* | 6/2019 | Mabee | ................ | G01F 23/248 |
| 2019/0271578 A1* | 9/2019 | Moeller | ................ | G01F 23/296 |
| 2019/0272495 A1* | 9/2019 | Moeller | ................ | G06Q 10/083 |
| 2019/0272496 A1* | 9/2019 | Moeller | ................ | G06Q 10/087 |
| 2019/0334769 A1* | 10/2019 | Stamatakis | ................ | H04L 67/125 |
| 2020/0157479 A1* | 5/2020 | Nunes Nogueira | ................ | C12M 41/30 |
| 2021/0407124 A1* | 12/2021 | Hinek | ................ | G06Q 20/18 |
| 2022/0036090 A1* | 2/2022 | Migdal | ................ | G06T 7/269 |

OTHER PUBLICATIONS

Ciosek, Patrycja, and Wojciech Wroblewski. "Sensor Arrays for Liquid Sensing: Electronic Tongue Systems." Analyst (London) 132.10 (2007): 963-978. Web. (Year: 2007).*

Hann, C.E et al. "Real-Time System Identification of a Nonlinear Four-Story Steel Frame Structure-Application to Structural Health Monitoring." IEEE sensors journal 9.11 (2009): 1339-1346. Web. (Year: 2009).*

Young, Lee; International Search Report and Written Opinion of the International Searching Authority; International Pat. App. No. PCT/US2020/054998; Jan. 28, 2021; 10 pages.

Krafft, Gerald; Extended European Search Report, including the European Search Opinion; EP Pat. App. No. 20875062.0; Sep. 14, 2013; 9 pages.

Williams, Nathan; Patent Examination Report No. 1; New Zealand Pat. App. No. 786900; Jul. 10, 2024; 3 pages.

Tagami, Ryuichi; Office Action issued in Japanese Pat. App. No. 2022-521168; Jul. 3, 2024; 8 pages including English translation.

* cited by examiner

SYSTEMS AND METHODS FOR REMOTELY MONITORING INVENTORY AND PRODUCT LIFE-CYCLE

CROSS-REFERENCE TO RELATED APPLICATIONS

The present application claims priority to PCT Application PCT/US20/54998, filed Oct. 9, 2020, and entitled "Systems and Methods for Remotely Monitoring Inventory and Product Life Cycle," which itself claims the priority of U.S. Provisional Patent Application Ser. No. 62/912,934, filed Oct. 9, 2019, and entitled "Systems and Methods for Remotely Monitoring Inventory and Product Life-Cycle," each of which is hereby incorporated by reference herein in its entirety.

BACKGROUND

Various types of liquids may be stored in containers, whether during production, processing, transportation, distribution, sale, or consumption. For example, during the production of wine, beer, or other types of alcohol and/or spirits, the liquid may be stored in a barrel for an extended period of time, which may range from several months to a number of years. There is a need for monitoring inventory, process, and product life-cycle data.

SUMMARY

In an embodiment, a remote monitoring system for monitoring inventory, process, and product life-cycle data is disclosed. Data may be collected from the remote monitoring system. The data can include information on raw material components, source information, production or storage location and movement, production or storage temperature, production or storage barometric pressure, packaging, distribution, sales, or combinations thereof.

In an embodiment, a remote monitoring system includes one or more sensor devices, each of the one or more sensor devices being coupled to a barrel and being configured to collect barrel data and to transmit the barrel data using low-energy wireless communication, wherein the barrel data comprises an air temperature, a barometric pressure, a humidity, and movement of the barrel. The system may also include one or more nodes positioned in a rickhouse or warehouse, each node in communication with at least one of the one or more sensor devices, and a gateway in communication with the one or more nodes and a local network. Each of the one or more sensor devices are configured to send the barrel data to the respective one or more nodes and the one or more nodes are configured to send the barrel data to the gateway.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
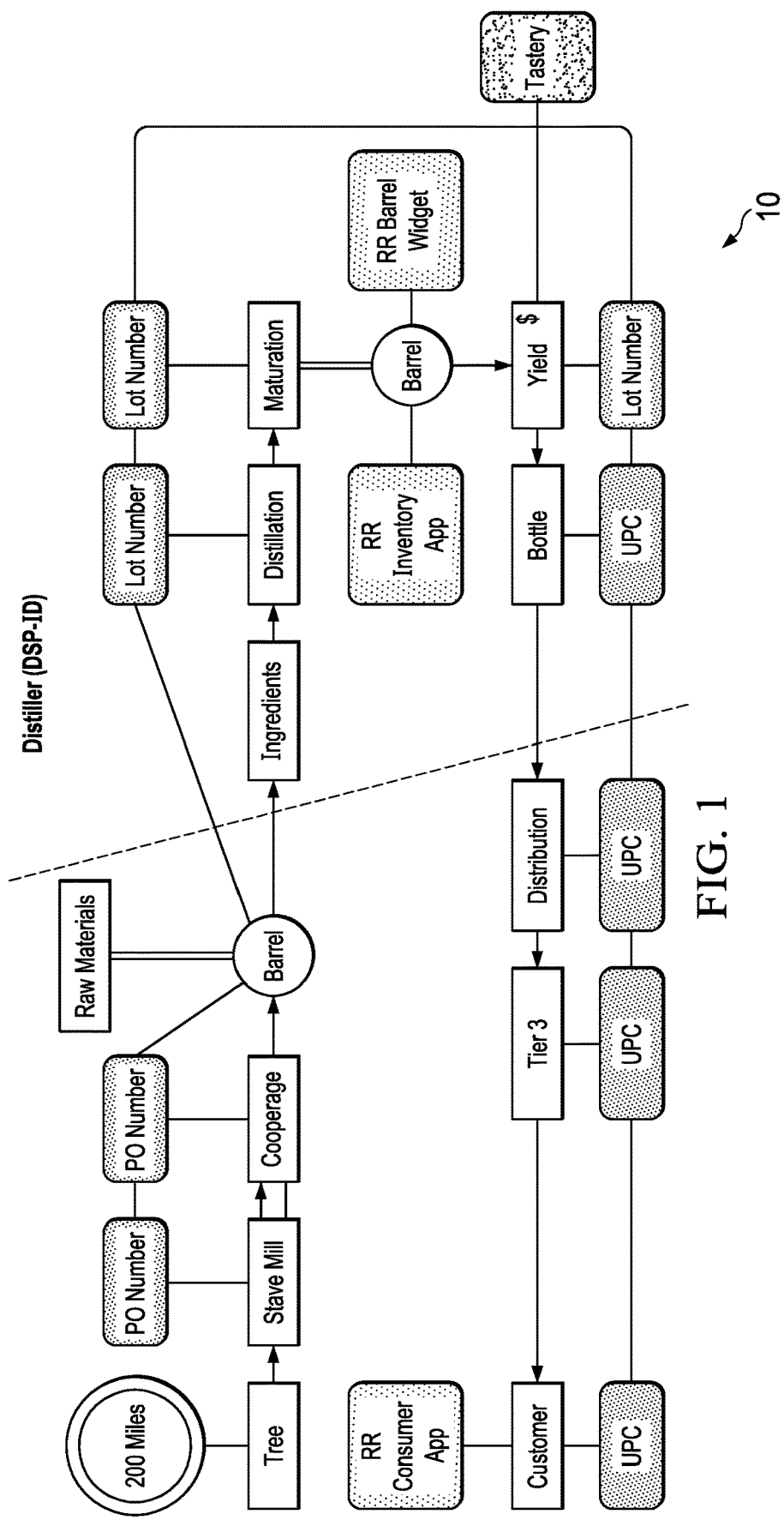
FIG. 1 schematically depicts a supply chain in accordance with a non-limiting embodiment.

Various non-limiting embodiments of the present disclosure will now be described to provide an overall understanding of the principles of the structure, function, and use of systems, apparatuses, devices, and methods disclosed. One or more examples of these non-limiting embodiments are illustrated in the selected examples disclosed and described in detail with reference made to FIGS. 1-39 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, then are described.

As described in more detail below, the present disclosure generally relates to remote monitoring of inventory and product life-cycle. While the following examples are described in the context of bourbon production for the purposes of illustration, this disclosure is not so limited. Instead, the systems, apparatuses, devices, and methods described herein can be applicable to a variety of instances in which liquid is stored in a container, such as during wine production or industrial liquids. Moreover, beyond liquids, the systems, apparatuses, devices, and methods described herein are also applicable to the remote monitoring of inventory and product life-cycle of non-liquid inventory and products. Thus, while many of the examples described herein relate to bourbon barrels, it is to be readily appreciated that the systems, apparatuses, devices, and methods can have applicability across a variety of different types of storage tanks, vessels, production processes, and the like.

Figure 2:
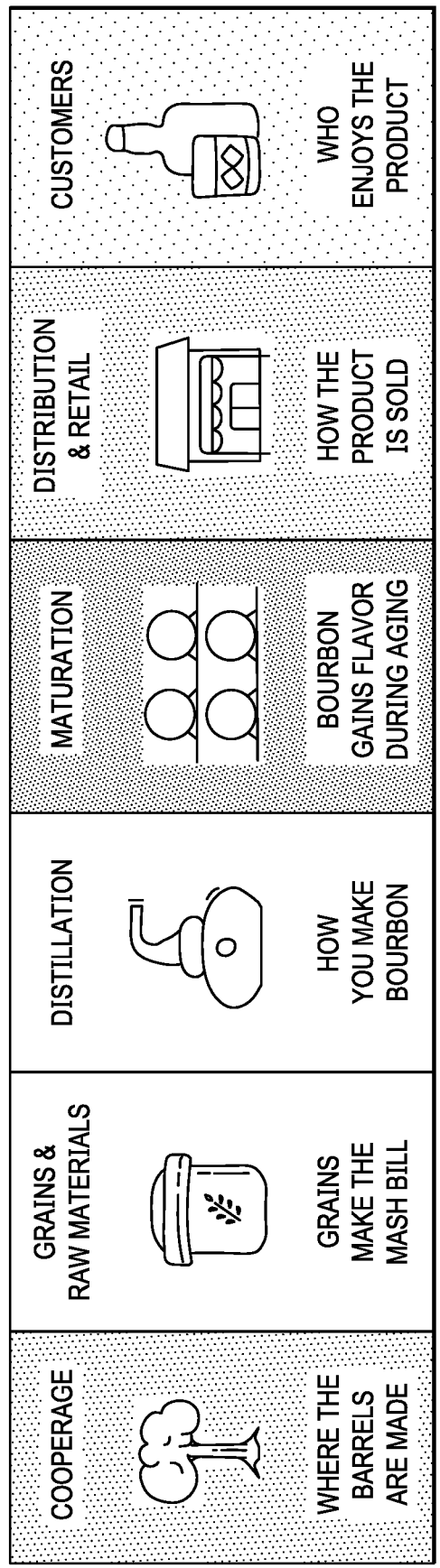
FIG. 2 schematically depicts a non-limiting example of a life-cycle of a product that may be remotely monitored in accordance with a non-limiting embodiment.

FIG. 1 schematically depicts a supply chain 10 in accordance with one non-limiting embodiment, and FIG. 2 depicts an example life-cycle 20 of a bourbon product. Staves are made from trees, which are in turn used to form barrels. Certain ingredients are used in the production and distillation processes. The distillate is aged in barrels, usually in a rickhouse. The aged bourbon may be sampled directly from the barrel or bottled. The bourbon is then distributed and eventually sold. An example system in accordance with the present disclosure may include a consumer application (e.g., a mobile phone "app") that is configured to provide information regarding the life-cycle of the bourbon product. In an embodiment, the consumer may scan the UPC code of a bourbon bottle. The consumer application may provide a wide variety of different types of data. Without limitation, the consumer application may provide information regarding the materials and source of the barrel components, the source of the ingredients, where the bourbon was distilled and matured, details of the aging process (e.g., temperature, barometric pressure, humidity, location, and movement of the barrel in the rickhouse), where the bourbon was bottled, details of the distribution and sales process, and combinations thereof.

Figure 3:
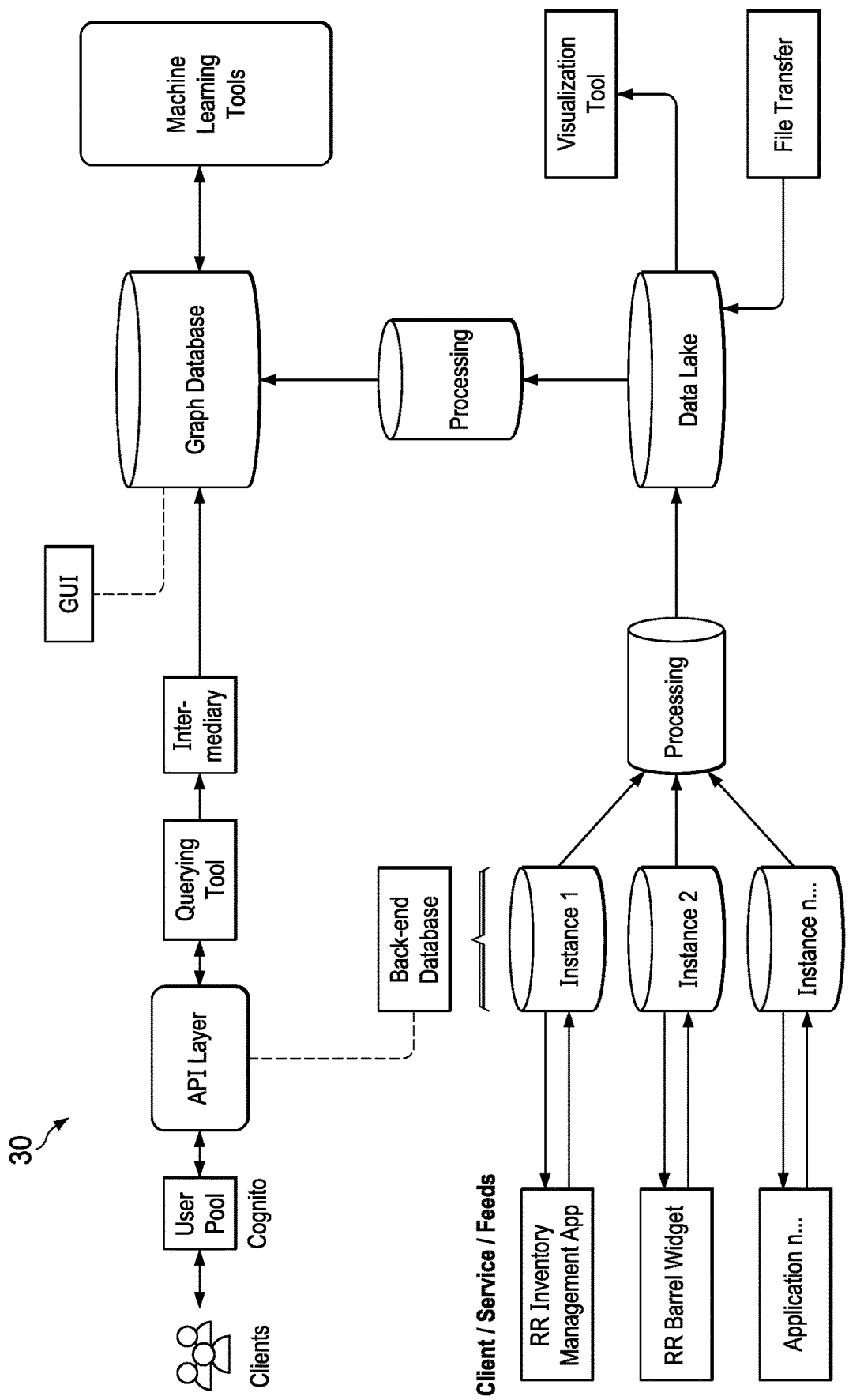
FIG. 3 schematically depicts a non-limiting example of a remote monitoring system.
Figure 4:
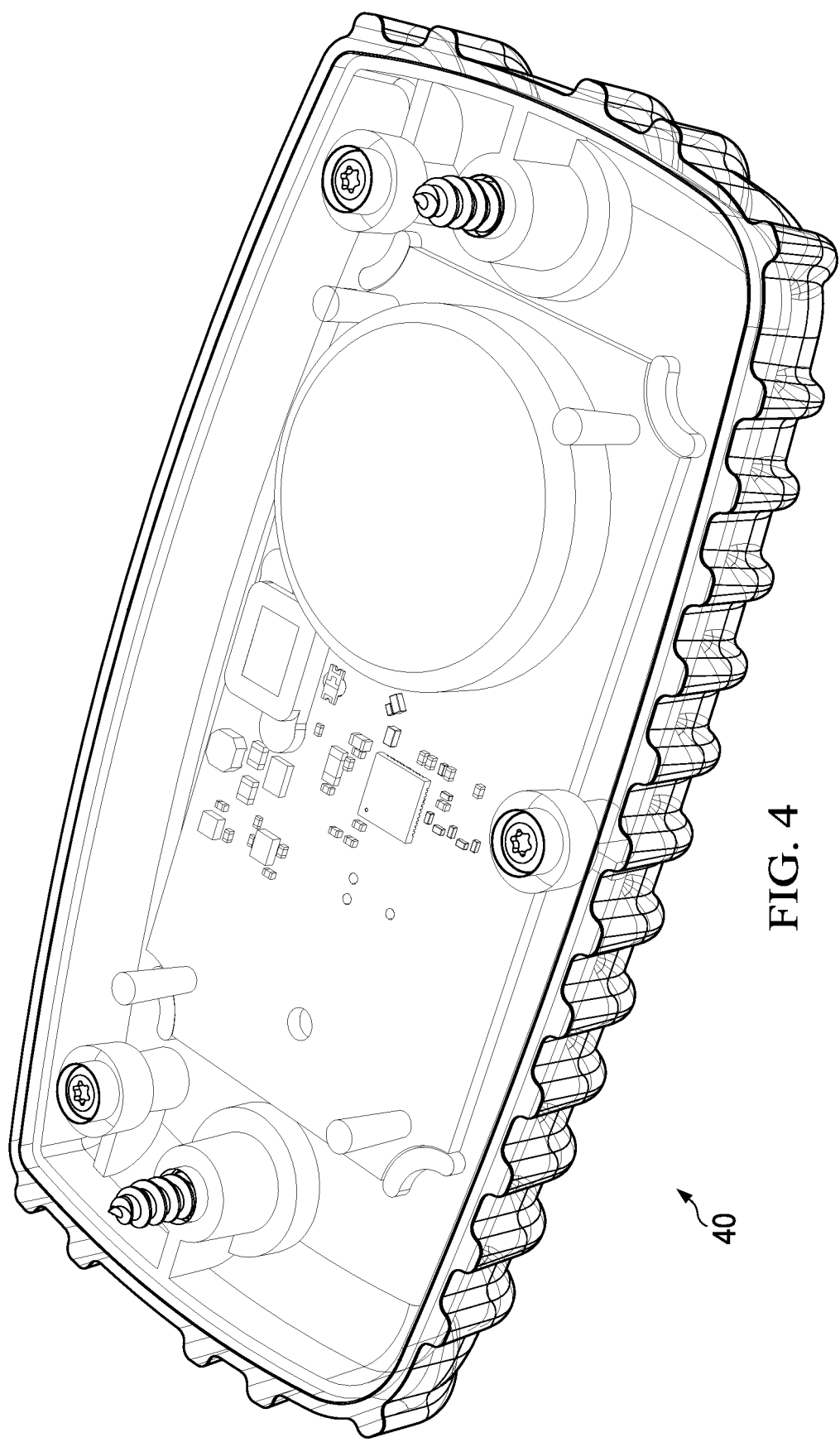
FIG. 4 is a back perspective view of a sensor device in accordance with a non-limiting embodiment.
Figure 5:
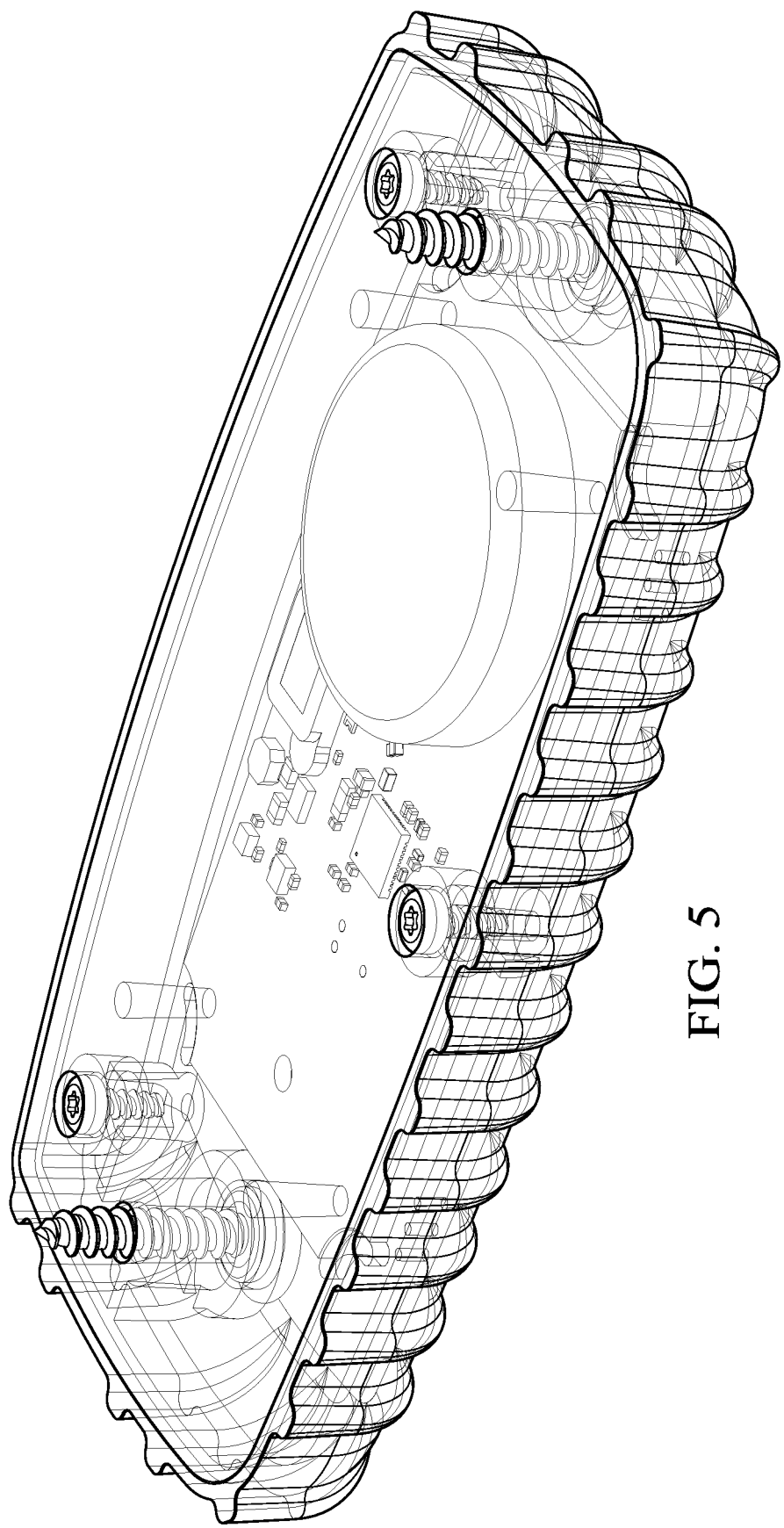
FIG. 5 is a back perspective view of the sensor device of FIG. 4 showing some transparent portions.
Figure 6:
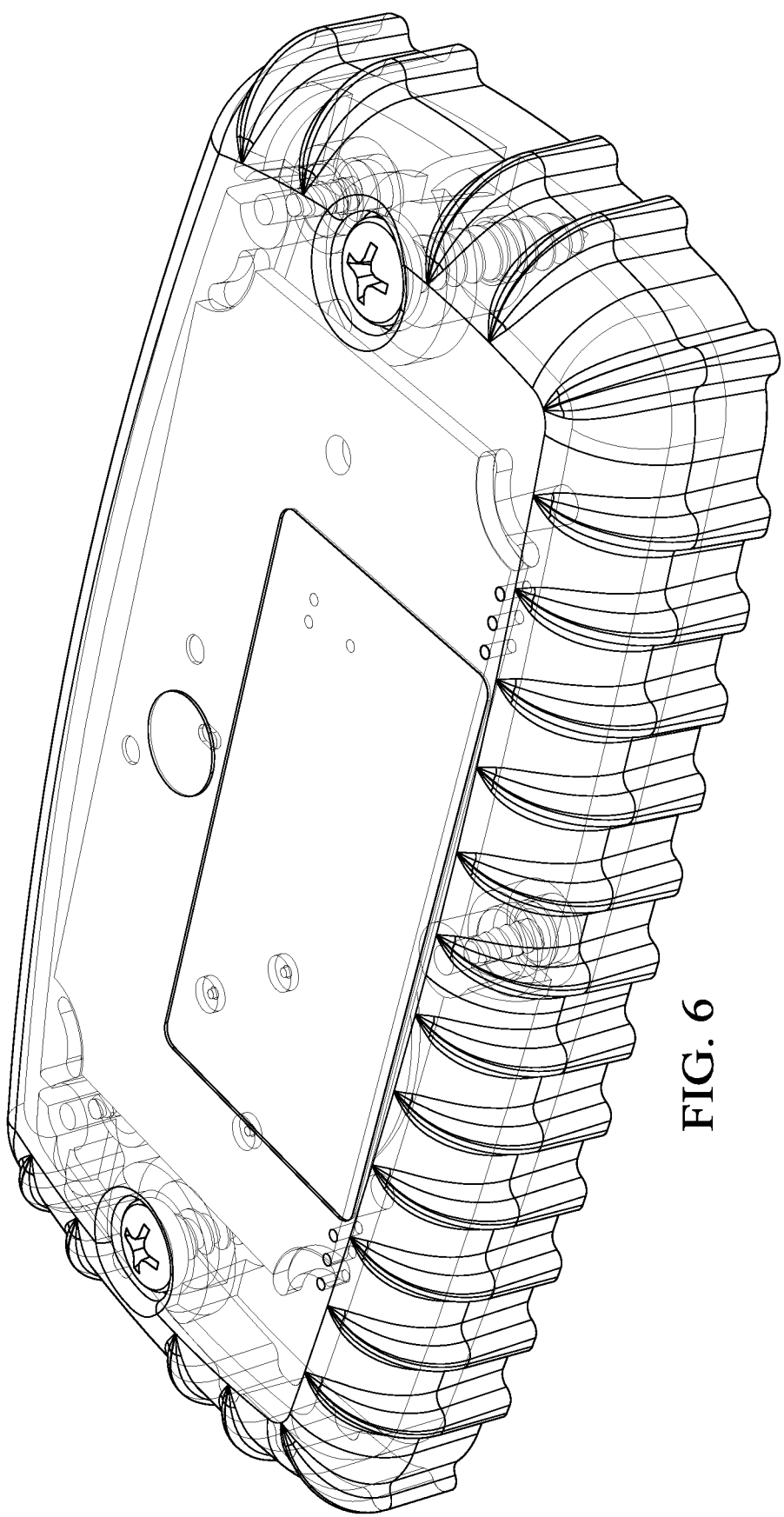
FIG. 6 is a front perspective view of the sensor device of FIG. 4 showing some transparent portions.
Figure 7:
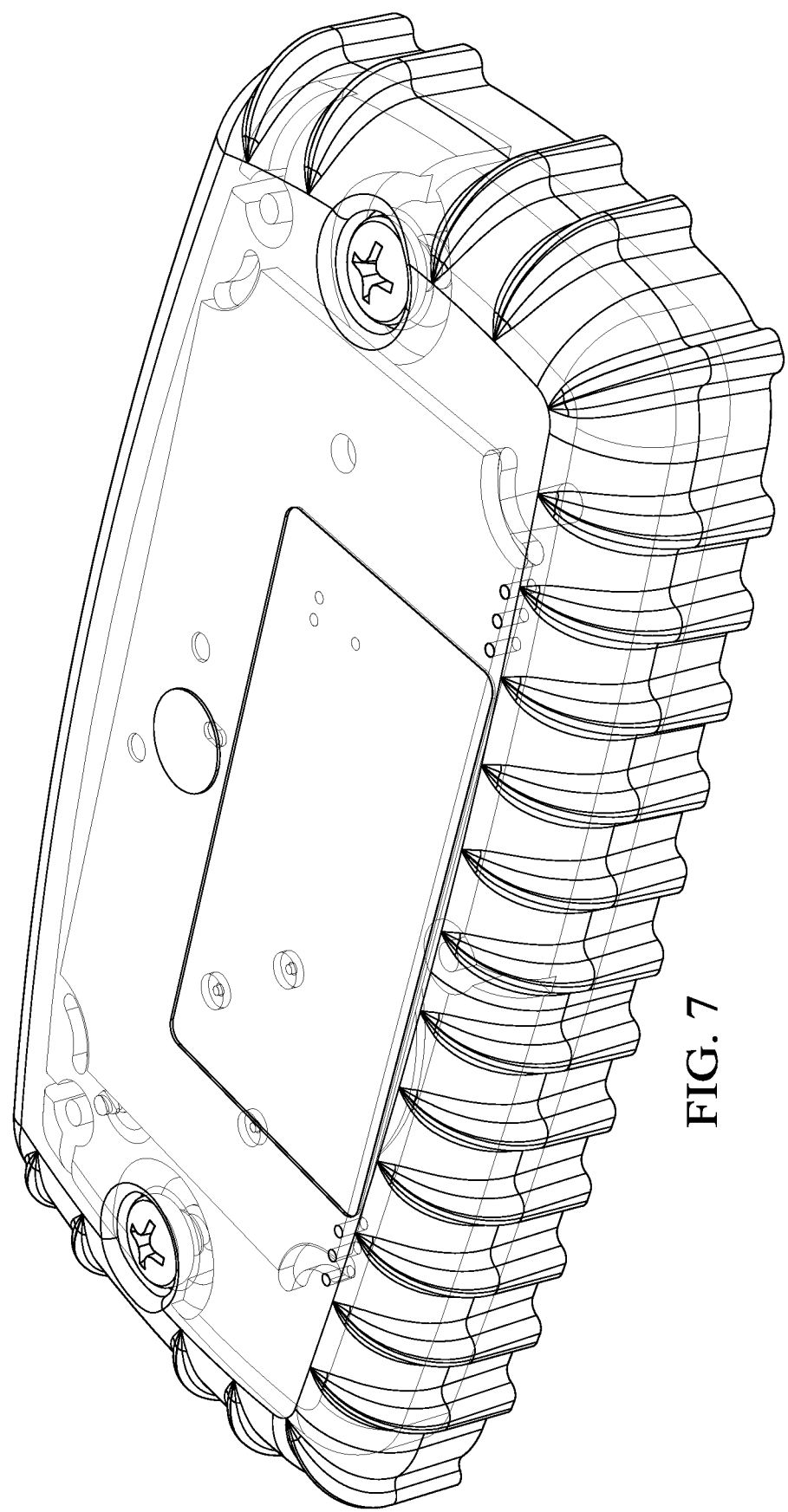
FIG. 7 is a front perspective view of the sensor device of FIG. 4.
Figure 8:
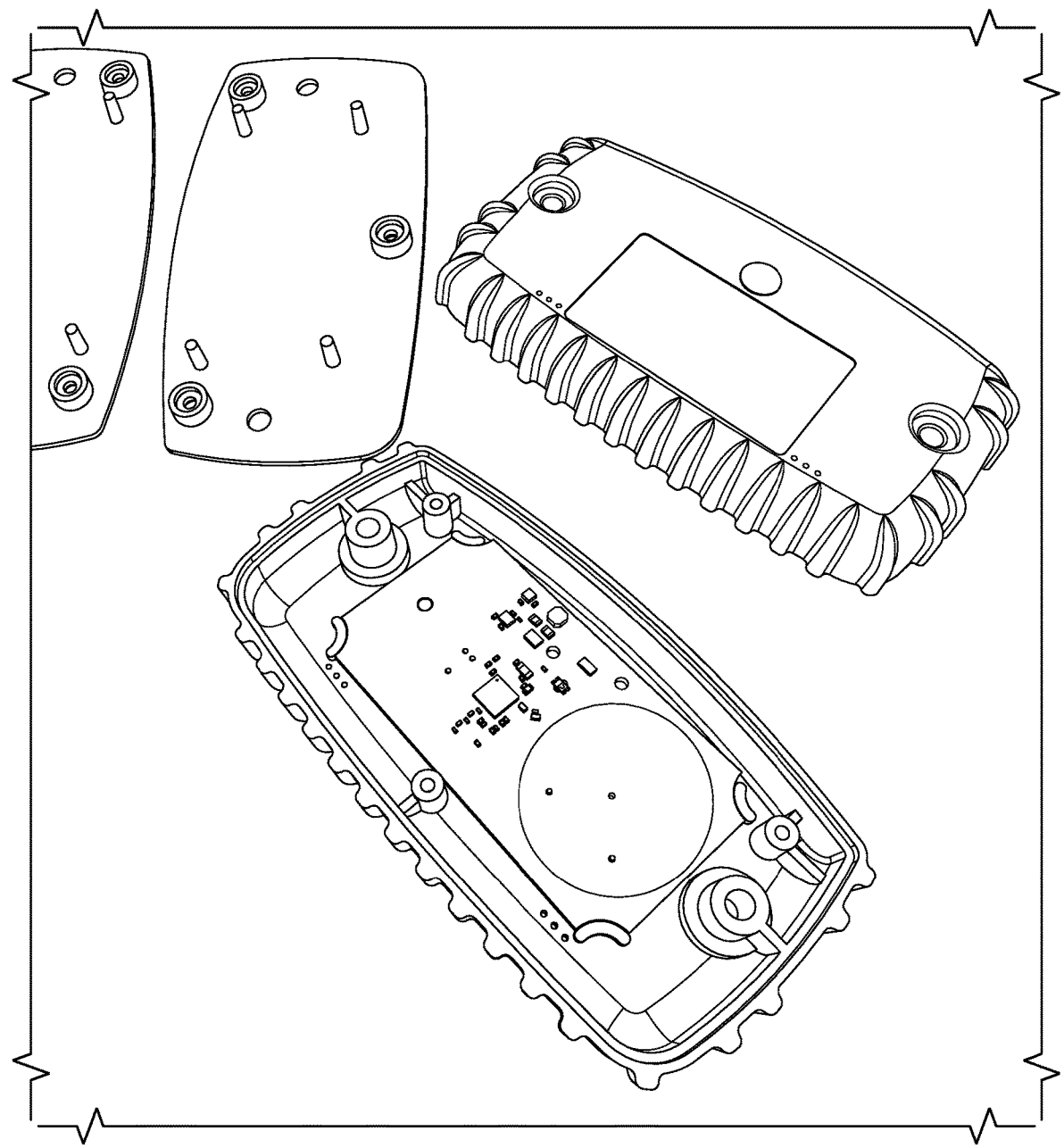
FIG. 8 is a photograph of a non-limiting example of a disassembled sensor device in accordance with a non-limiting embodiment.
Figure 9:
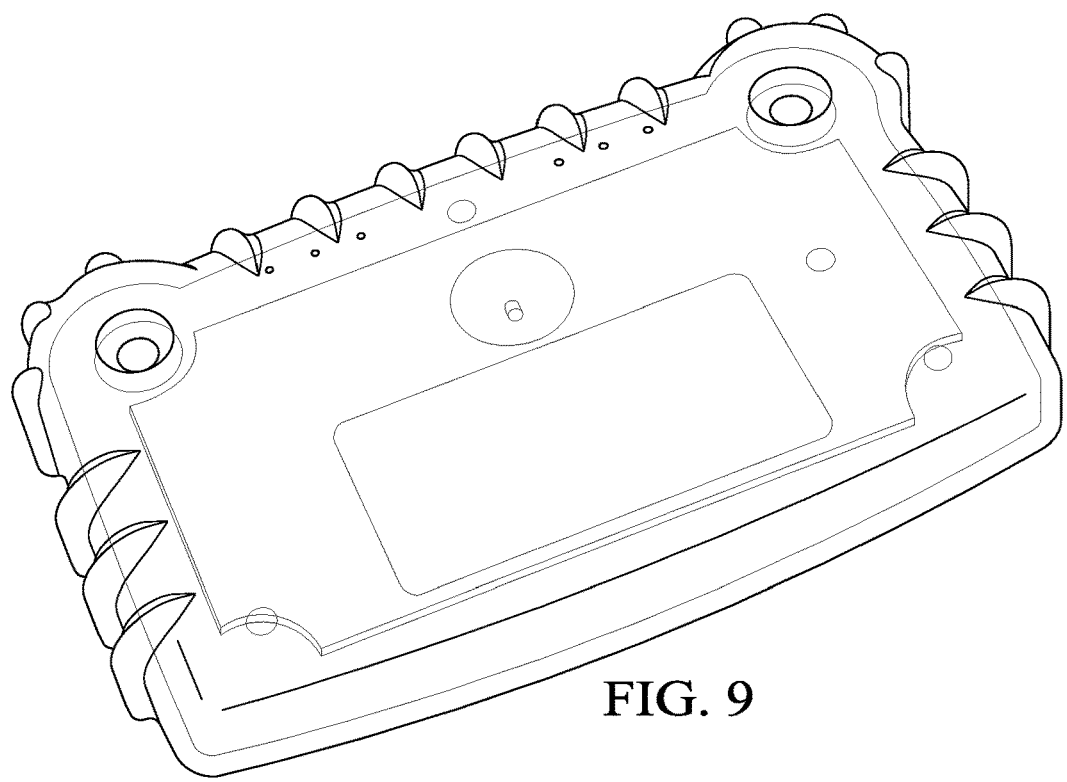
FIG. 9 is a front perspective view of a sensor device in accordance with a non-limiting embodiment.

FIG. 3 schematically depicts an example system 30 that allows for the remote monitoring by, for example, the product manufacturer, a sales team, or a client according to an embodiment. The system may include a one or more of a back-end database, a data lake, and a graph database. The back-end database may be a serverless, highly scalable NoSQL database that is the primary back-end component for applications, client-side services, and API data ingestion. An example of a back-end database service is Amazon DynamoDB. In an embodiment, each application or client may have its own back-end database cloud instance. Where each client has their own database cloud instance, the data from each client is partitioned. A database cloud instance may be wrapped in a standalone virtual private cloud/EC2 security group for security purposes.

The data lake may be comprised of destination buckets for data coming out of the back-end database, as well as post-processing buckets for data that will make its way into the graph database and a visualization tool, as described further below. An example data lake service is Amazon Web Services (AWS) S3. The data lake allows storage of big data in a cost effective manner. By having a lake of replicated data in flat format, the system may allow scientists to access and analyze the various data sets collected.

Given the highly interrelated nature of the data sets, utilizing a graph database may allow for a deep learning library to extract from for machine learning purposes. Further, using a graph structure for designing the relations between data improves the granularity with which node structures can be designed. For example, a node could be a flavor profile, and the system could draw a relation from flavor to a market price node to see the relative correlation between these two data points across the scale of the whole graph database. An example of a graph database service is AWS Neptune. The graph database may have a related GUI for interacting with the data. The GUI may allow for a user to query and load data from data lake buckets, visualize and traverse the graph database, customize the appearance of the data for presentation purposes, and discover key relationships and insights with built in clustering analysis. An example GUI is provided by Tom Sawyer Software.

In an embodiment, when data is transferred between any of the back-end database, data lake, and graph database, the data may be processed. For example, the data lake receives data replicated from the back-end database. This replicated data may undergo processing prior to being stored in the data lake. The processing may be handled by a processing service. Examples of processing services include, without limitation, Kinesis Data Firehose, AWS Glue, and AWS Lambda. The pre-processing service may be configured to set scheduled replication jobs or on demand jobs from moving data from the back-end database instances to the data lake. The processing service may be configured to do data transforms with high throughput and minimal latency without the need for big-batch processing, which is beneficial if the system is using real time or near real time information from the data lake. In an embodiment, the processing service may include a schema crawling feature. As data is sourced from the back-end database, the service will crawl the feeds and automatically create suggested schema design for transforming the data.

In an embodiment, the system may include a processing step when transferring data from the data lake to the graph database. The processing may include changing the data format, for example, to a CSV format. In an embodiment where the graph database is not utilized as a real time data set, the data may be processed in bulk and transferred at discrete intervals. Prior to initiating the HTTP request, new data will be pulled out of a data lake bucket, transformed, and then loaded into a new data lake bucket with a wrapper, such as a VPC wrapper, ready for the graph database to query. This method would entail creating a data lake endpoint, such as a S3 VPC endpoint, on a designated bucket for the graph database to access and retrieve data. An EC2 instance can then be queried via a curl request to grab the bucketed data in bulk. In an embodiment, the system may be configured to trigger the curl request every time new data is available in the post-processing data lake bucket.

The system may include a protocol for transferring data or files between external systems and any of the back-end database, data lake, and graph database. The transfer protocol is configured to receive files that are put in, for example, data lake buckets as they come. Examples of data transfers would include sample PO data files, a customer file (e.g., from Drizly), a UPC matched file (e.g., from Aperity or VT Info), etc. The transfer protocol may be configured to automatically bring new data into the data lake. An example of the transfer protocol may be the SSH File Transfer Protocol (SFTP).

In an embodiment, the system may include machine learning tools to ingest, parse, and analyze the large amount of data. The system may include heuristic tools to discover patterns and insights across the data repository. Example tools include, without limitation, SageMaker, the AWS Machine Learning library offered natively in the cloud, TensorFlow, and Jupyter Notebooks.

In an embodiment, the system may include a tool for visualizing the data coming from the back-end database for macroanalytics, such as for sales and fundraising purposes. An example visualization tool is AWS QuickSight. The visualization tool may query directly from the data lake buckets. The tool may include natural language processing, meaning that text summaries can be constructed directly from the visualization of the data.

In an embodiment, the system may include a tool that utilizes an API language as an engine for querying various data sources. Such a data query and manipulation language may be, for example, GraphQL, which is a combined API stylization, protocol, and language. The querying tool may be, for example, AWS AppSync. The tool may be configured to create new APIs in minutes and can use a user directory, such as Amazon Cognito, for user provisioning and authentication. As a part of this initial architecture design, a user pool may be set up with varying authentication privilege levels. Through the querying tool and API layer, the collected data may be displayed on one or more applications (e.g., mobile device "app"). These applications allow, for example, a consumer to review the life-cycle data of the product or an employee (e.g., operations, warehouse, IT) to review production, storage, and inventory information.

In an embodiment, the system may include an intermediary between the querying tool and the graph database. Such an intermediary may be useful where the querying tool and graph database are not configured to interact directly. The intermediary may be, for example, Lambda function that acts as the data source from the querying tool and in turn requests the data from a Neptune endpoint.

Figure 10:
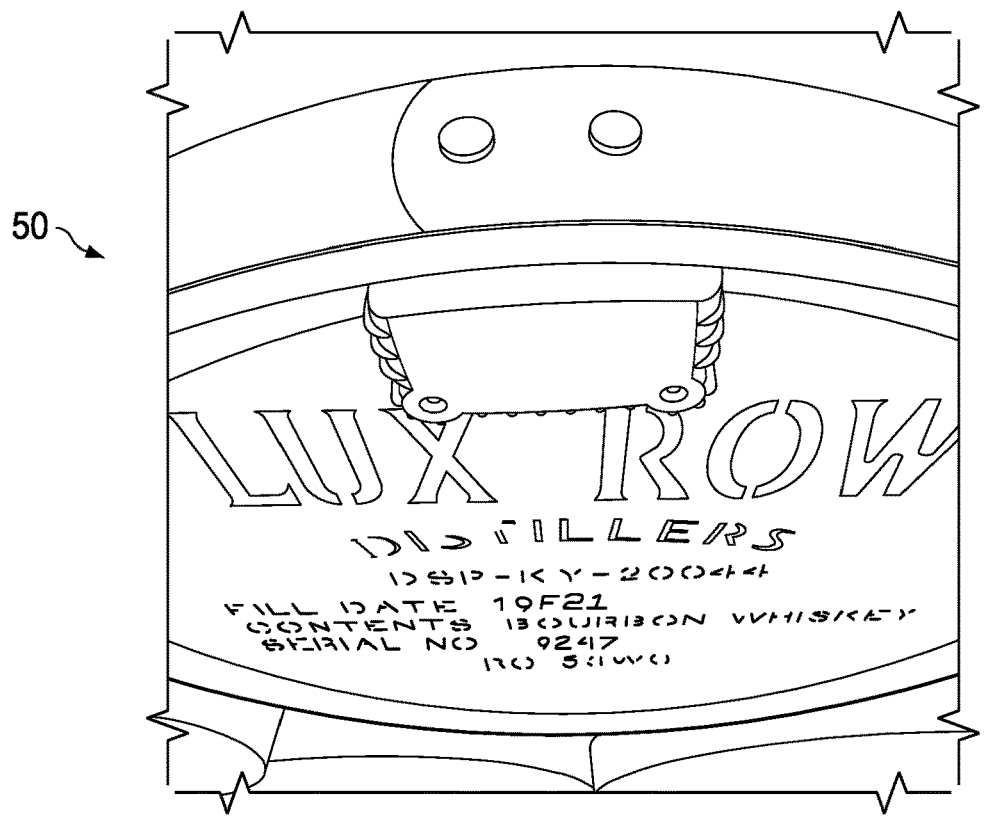
FIG. 10 is a photograph of a non-limiting example of a sensor device installed onto a wall of a container.

Now referring to FIGS. 4-10, in various embodiments, the system may include a sensor device 40 configured to be attached to or otherwise associated with a container 50, such as a bourbon barrel. The housing and components of the sensor device 40 may be made of materials that conform to intrinsic safety, N1D1, N1D2 and/or explosion proof standards. FIG. 10 depicts an example embodiment of a sensor device coupled to an end wall of a wooden storage container. With regard to coupling the sensor device to the container, the sensor device can be fastened to an outside surface of the end wall (e.g., head of the barrel) using screws, magnets, adhesive, or another connection technique. For example, stainless steel screws of less than 1.5 inches in length may be used to secure the sensor device to a barrel. In an embodiment, a bracket or brace may be attached to a barrel, and the sensor device may be removably coupled to the bracket or brace. For another example, industrial and food safe adhesives may be used, such as component epoxy adhesives or any adhesive that satisfies the U.S. Food and Drug Administration's guidelines for food safety. In another embodiment, the sensor device may be configured to snap fit to the barrel; for example, a section of the barrel may be milled to receive the sensor device. Additionally, for example, magnets may be coupled to the barrel (e.g., at the metal hoops), and a corresponding magnet may be positioned on the sensor device to allow for the sensor device to be removably coupled to the barrel. In other embodiments, the sensor device can be coupled to another portion of the container, such as the side wall, for example.

The sensor device may monitor, for example, the temperature, barometric pressure, humidity, location, and movement of a barrel being stored in a rickhouse. The measurements may be, for example, +/− about 5% accurate, between +/− about 1% to 5% accurate, or +/− about 1% accurate. The sensor device may be configured to take measurements at discrete intervals. For example, sensor measurements may be made once a day, once every 12 hours, once every 6 hours, once every 2 hours, once every hour, or once every 10 minutes, among other suitable intervals that provide sufficient data granularity. In an embodiment, the sensor device is configured to store the measurements, such as in an internal RAM.

In an embodiment, the sensor device can include a sensor array having at least one sensor. In some embodiments, the sensor array can be positioned inside the housing, although this disclosure is not so limited. The at least one sensor can be used to determine the location of the container and the related temperature, barometric pressure, and/or humidity, among other characteristics. In accordance with various embodiments, the sensor device can include an external housing. The external housing can house various componentry, such as sensing componentry and communication componentry. The sensing componentry may include an environmental sensor. The environmental sensor can be, for example, a Bosch BME280 Pressure/Temperature/Humidity sensor. In some embodiments, the sensing componentry includes a gravity vector sensor, such as a Bosch BMA253 3-axis Accelerometer, for example. An accelerometer measures true north and determines clocking of barrel as well as measures barrel movement. Additionally, the sensor device may include an NFC Chip that allows for near-field communications and allows for mapping of the barrel based on the location of the sensor device.

In various embodiments, the sensor device can communicate data via a wireless connection to a remote computing device. For example, sensor information collected by the sensor device can be wirelessly transmitted. The connection method may be a low-energy wireless communication radio, such as Bluetooth Low Energy (BLE) technology, LoraWAN, ANT, ZigBee, and/or RF4CE. In an embodiment, the sensor device repeatedly advertises for a connection (e.g., every five minutes). The connected device can query and retrieve the stored measurement data (e.g., using GATT services). In addition, the most recent sensor data may be included in the advertising data every 20 minutes, or other suitable interval. This example approach provides three opportunities each hour to obtain the sensor data without requiring a BLE connection. The addition of the updated sensor data in the advertisements can also create a minimal increase in the power usage. Thus, obtaining the sensor data via the advertisements saves the power required to connect and pull the data.

In an embodiment, the sensor device is battery powered. The sensor device may be configured to have a battery life of 10 years or greater. For example, the battery may be a lithium battery, such as a Li—SOCl$_2$ battery. An example of a suitable Li—SOCl$_2$ battery is a Tadiran TL-5934 battery. Example 1 below describes a non-limiting power measurement setup and empirical data obtained from measuring the current draw during different phases of operation.

Figure 11:
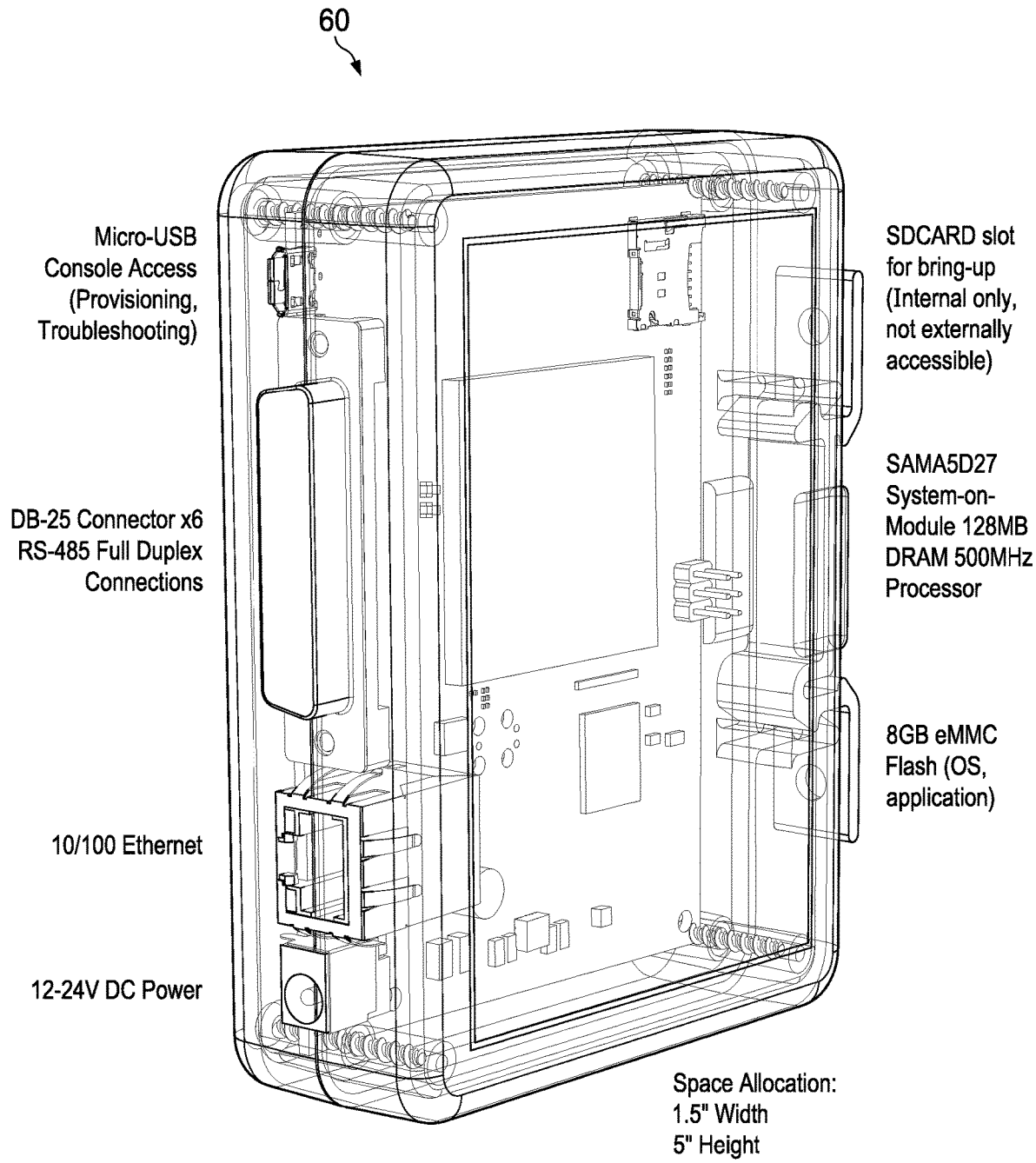
FIG. 11 depicts a gateway in accordance with a non-limiting embodiment.
Figure 12:
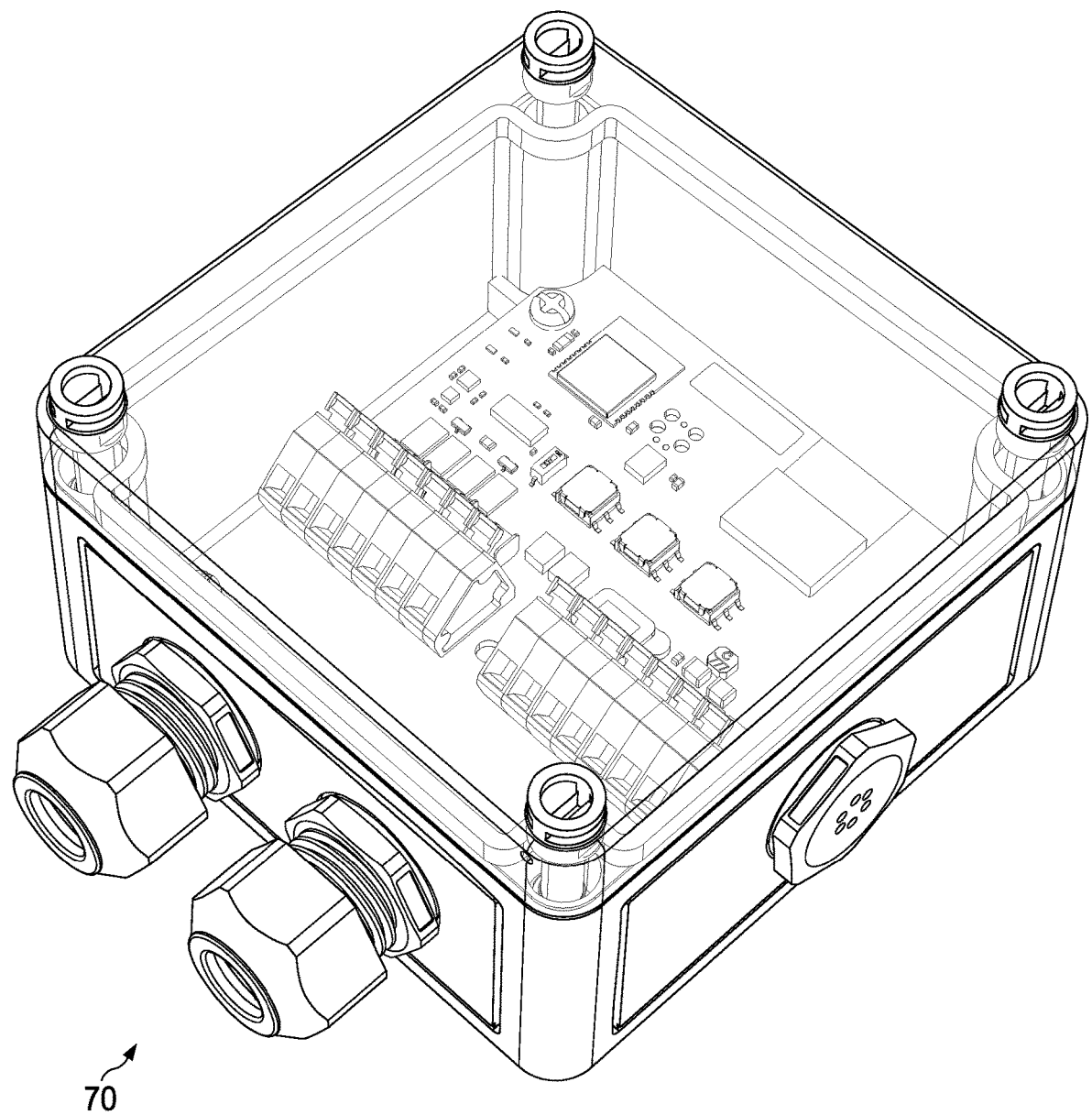
FIGS. 12-19 are photographs of a node in accordance with a non-limiting embodiment.
Figure 13:
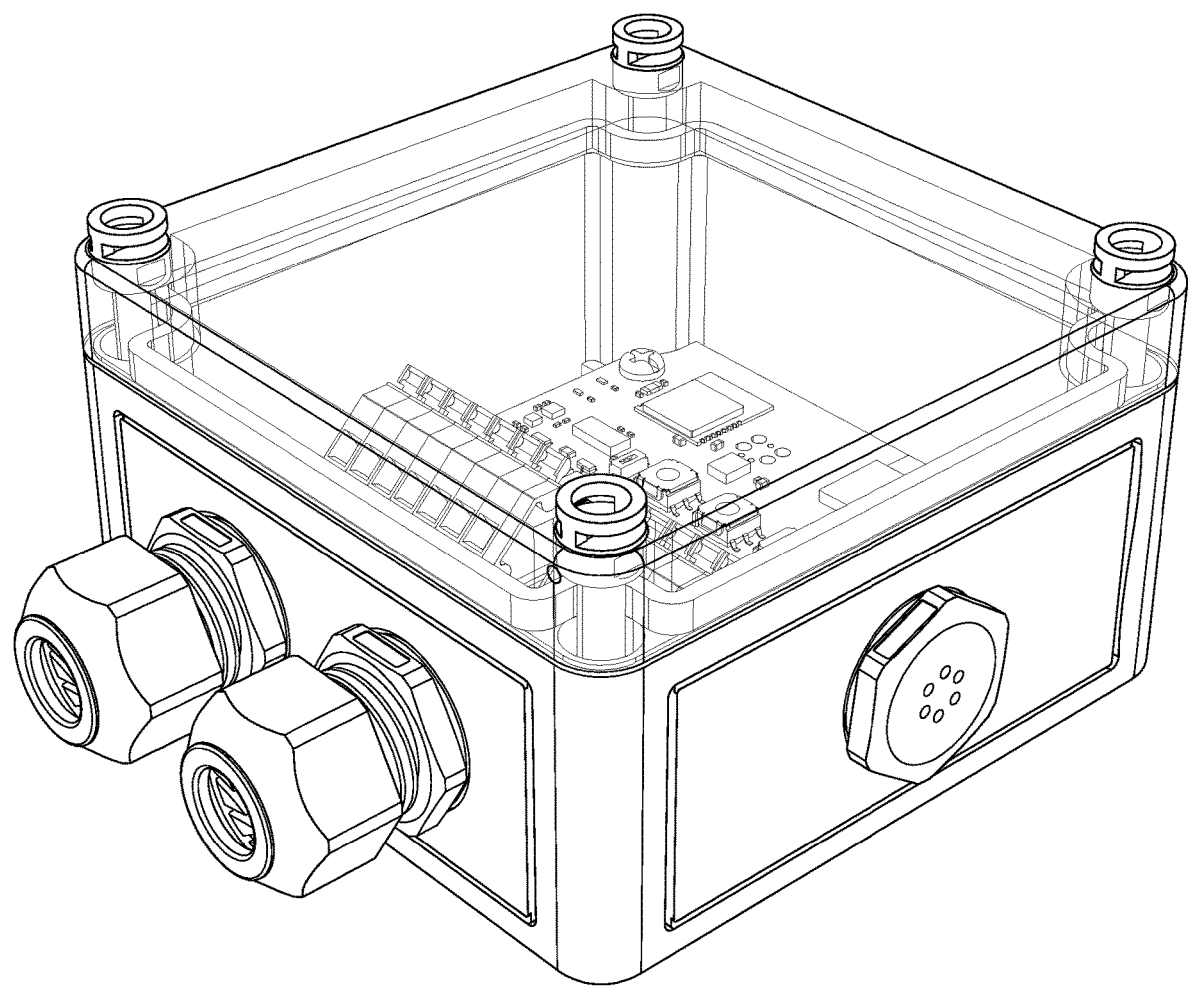
Figure 14:
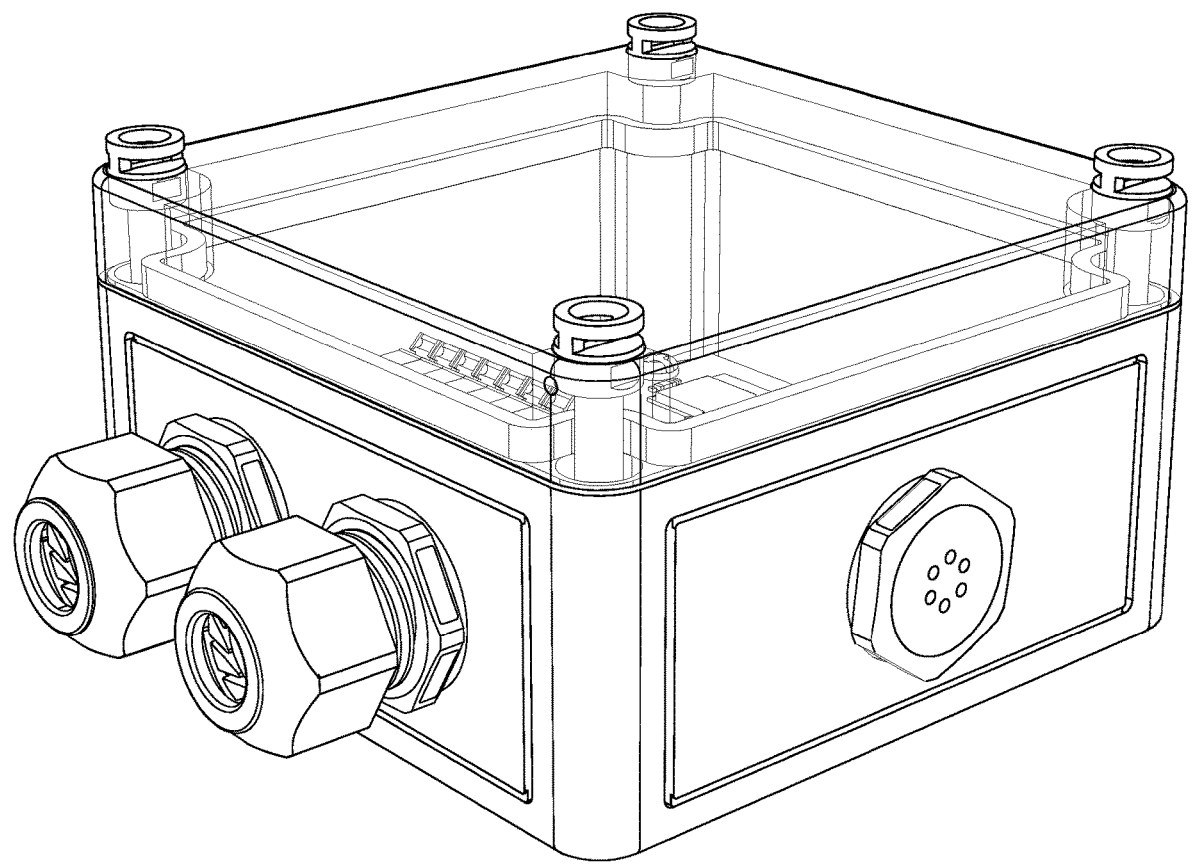
Figure 15:
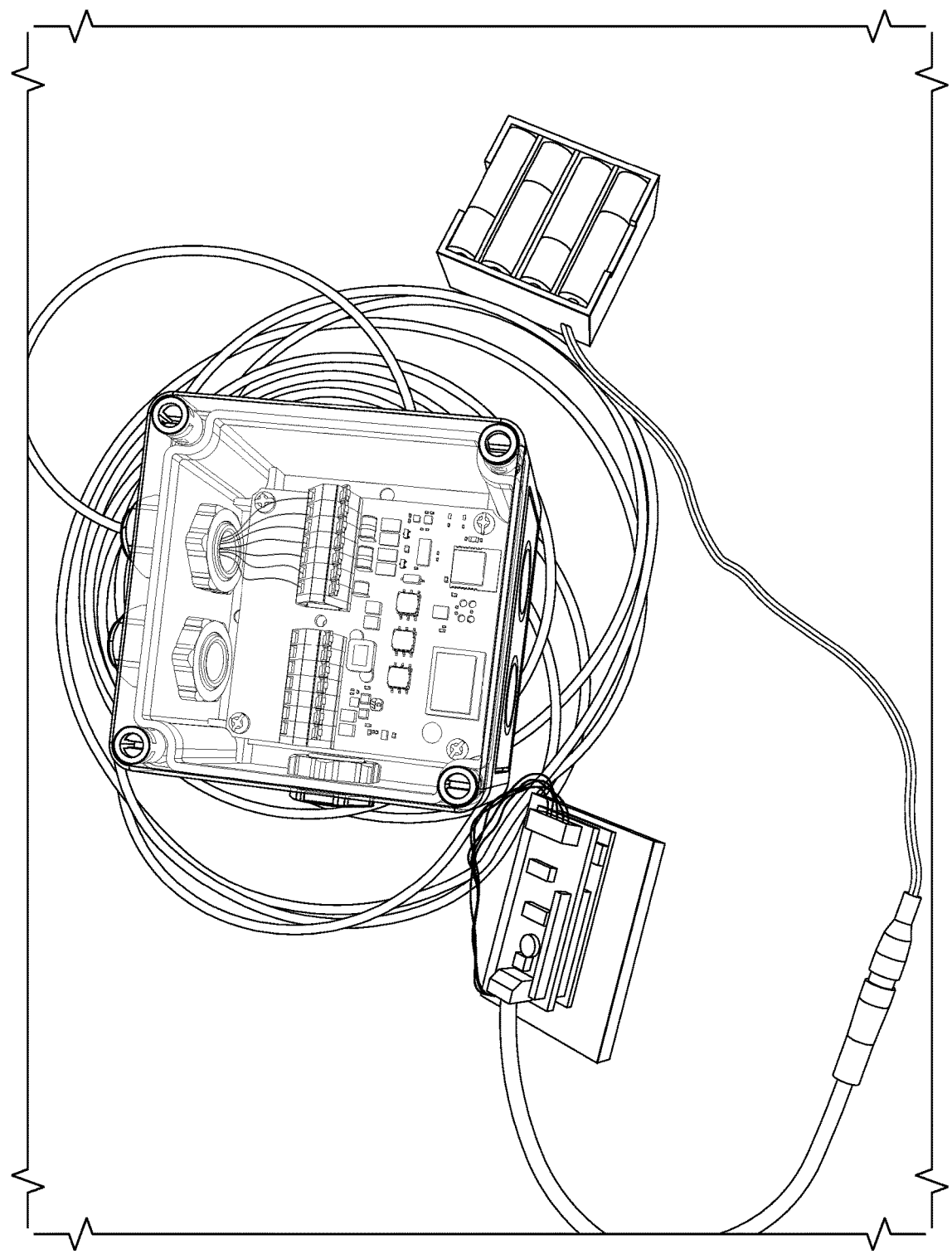
Figure 16:
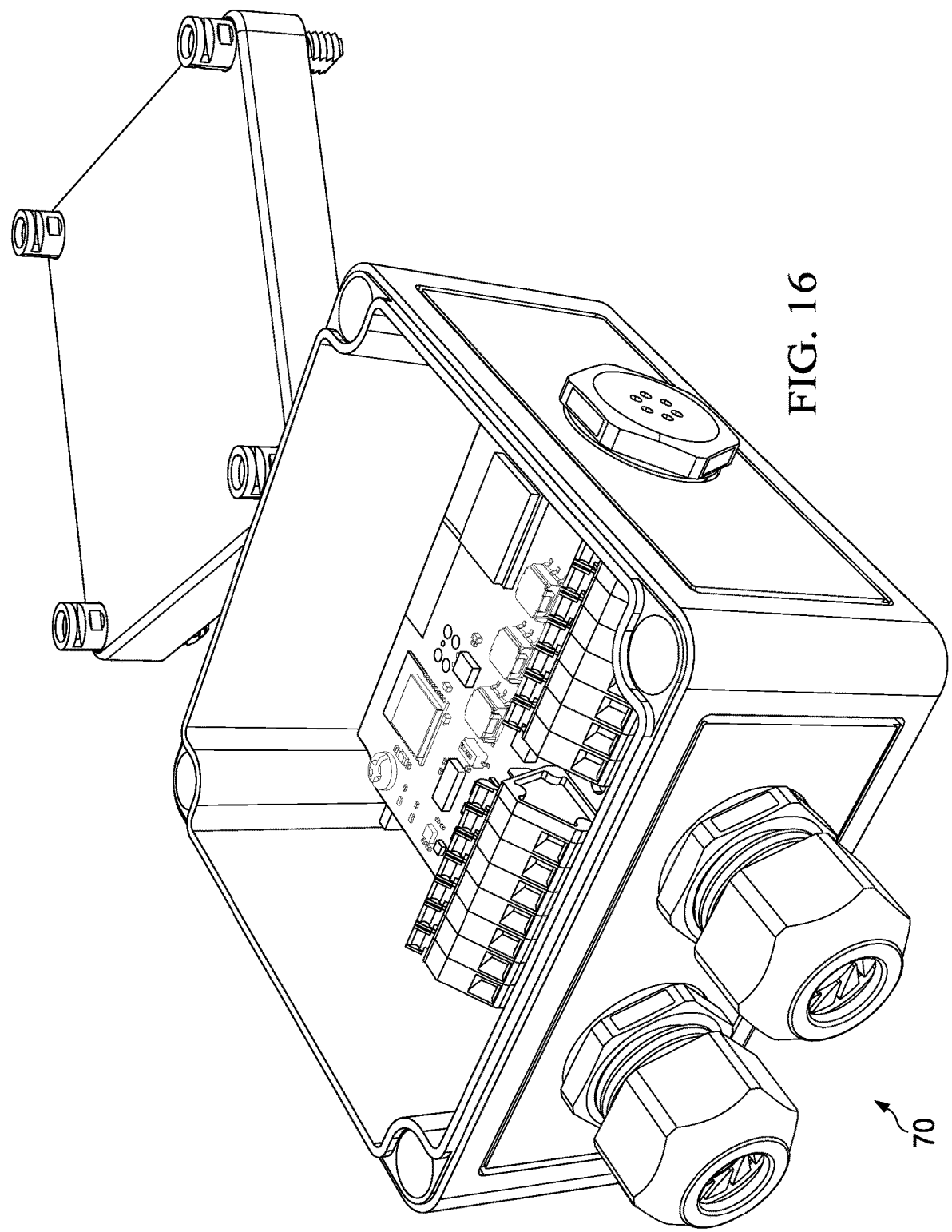
Figure 17:
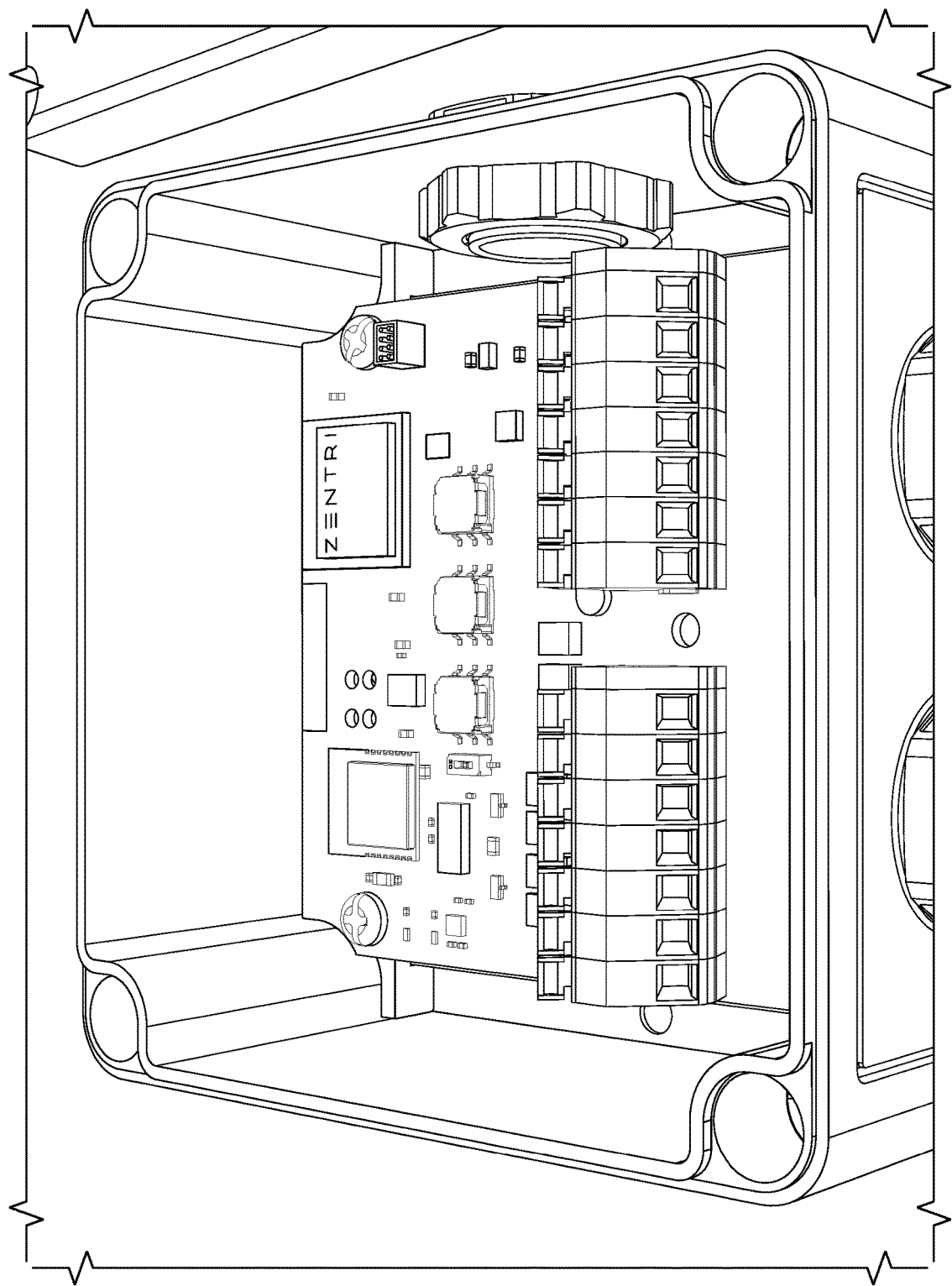
Figure 18:
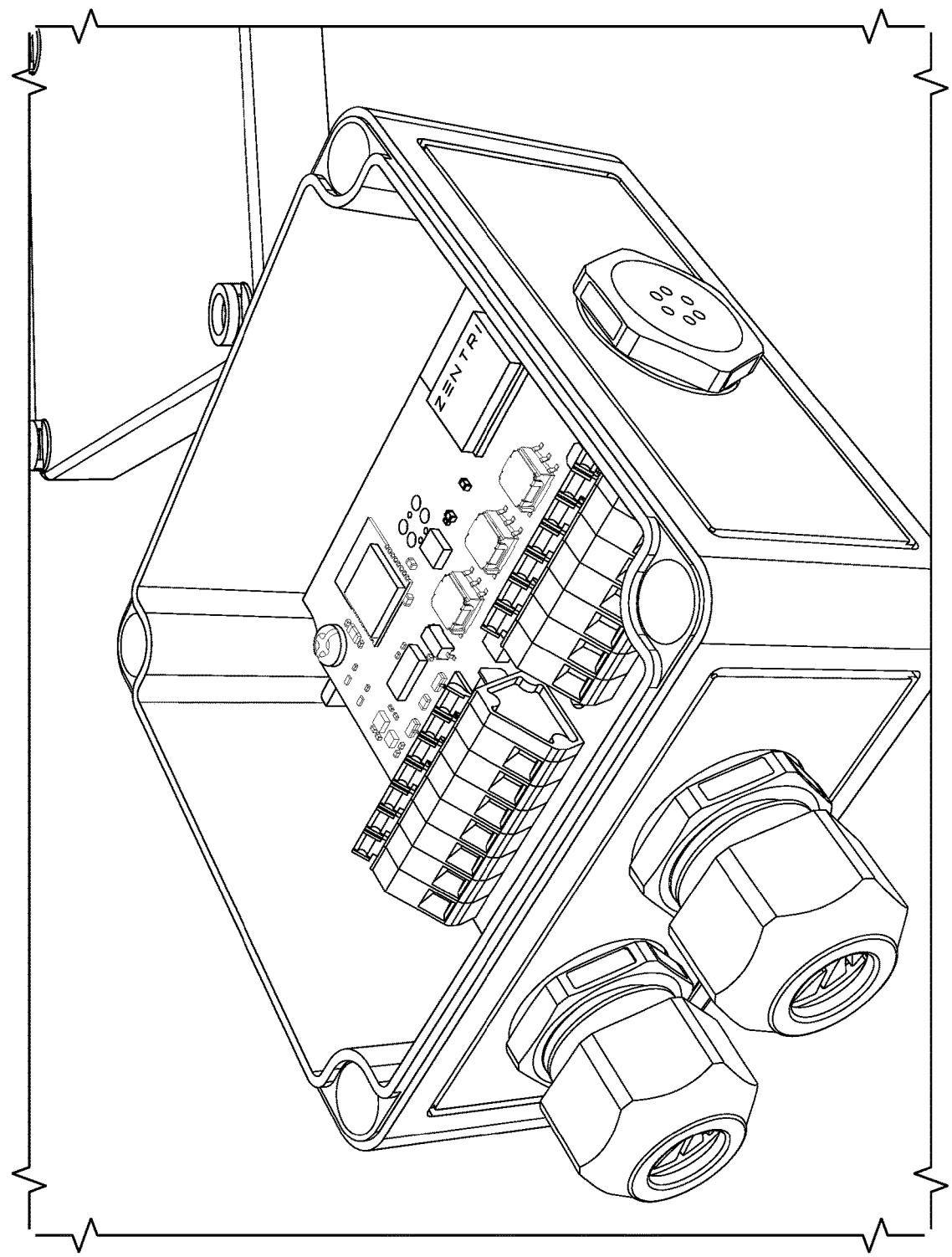
Figure 19:
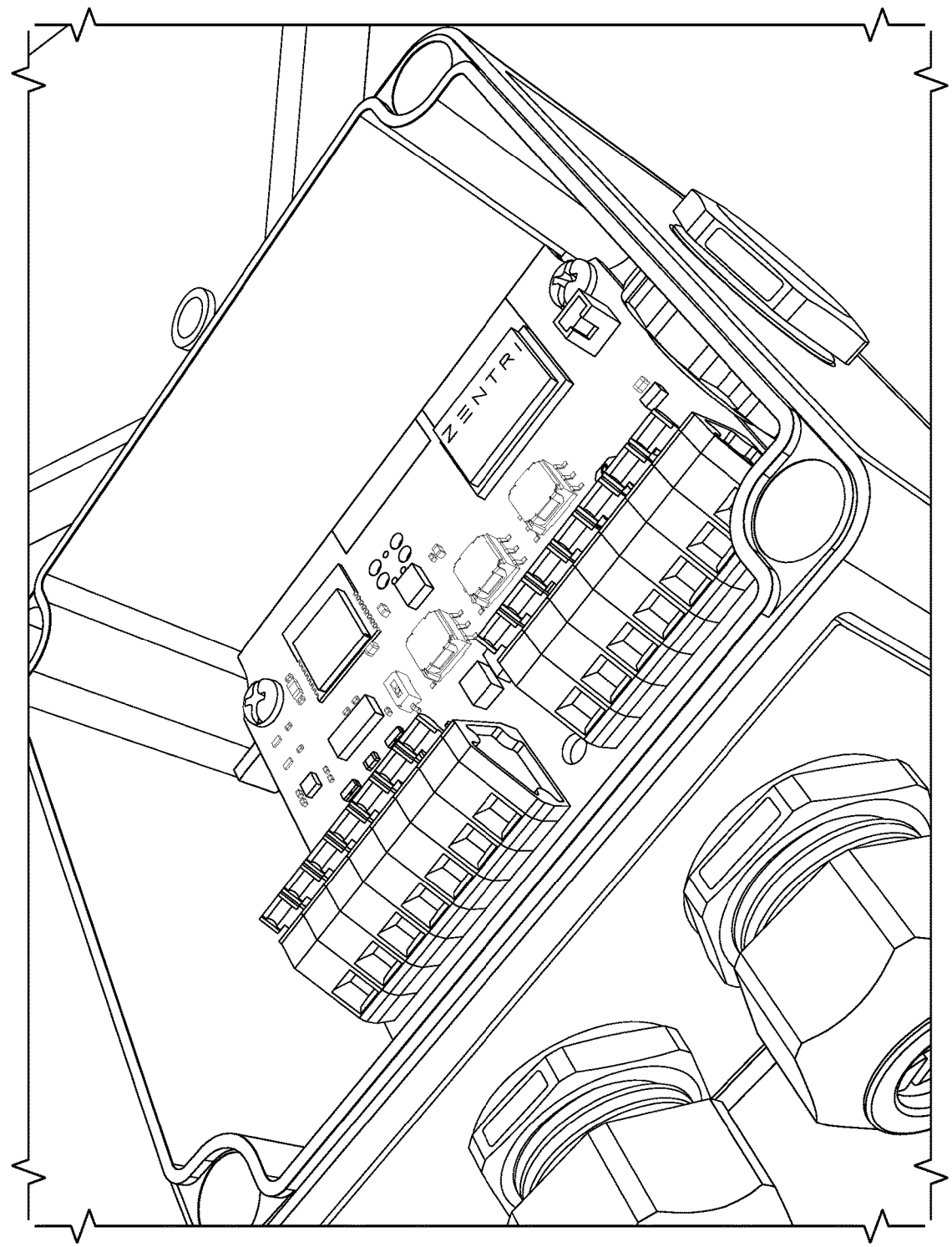
Figure 20:
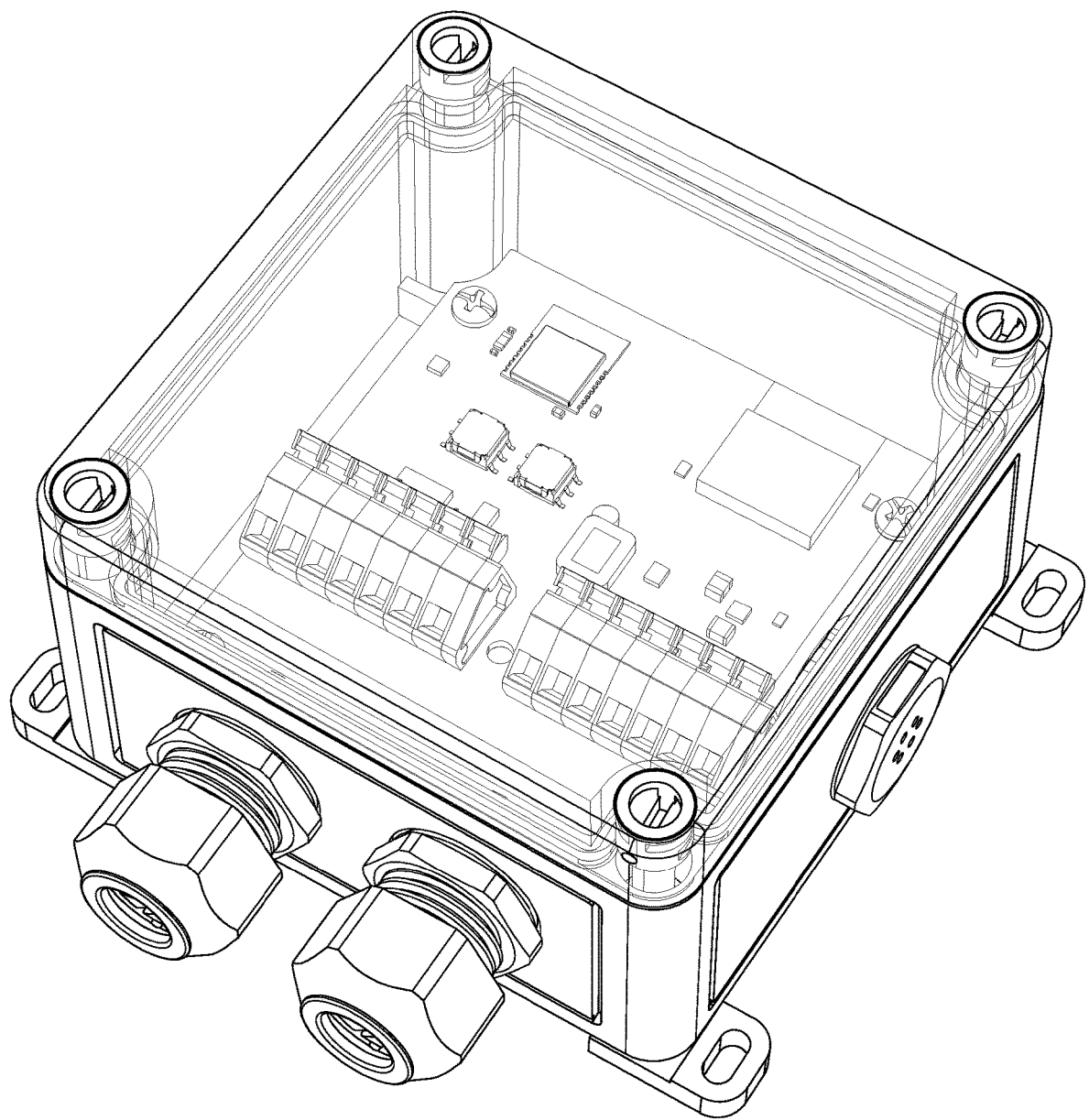
FIG. 20 depicts a node in accordance with a non-limiting embodiment.
Figure 21:
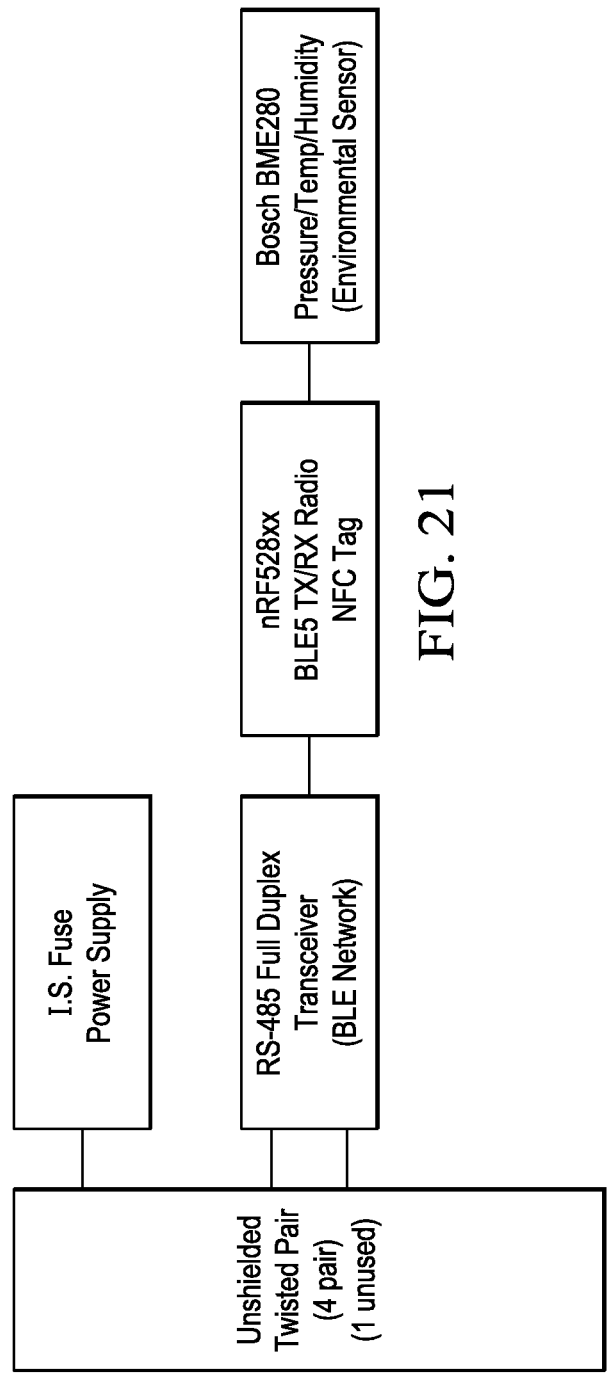
FIGS. 21-24 schematically depict relay node electronic block diagrams in accordance with various non-limiting embodiments.
Figure 22:
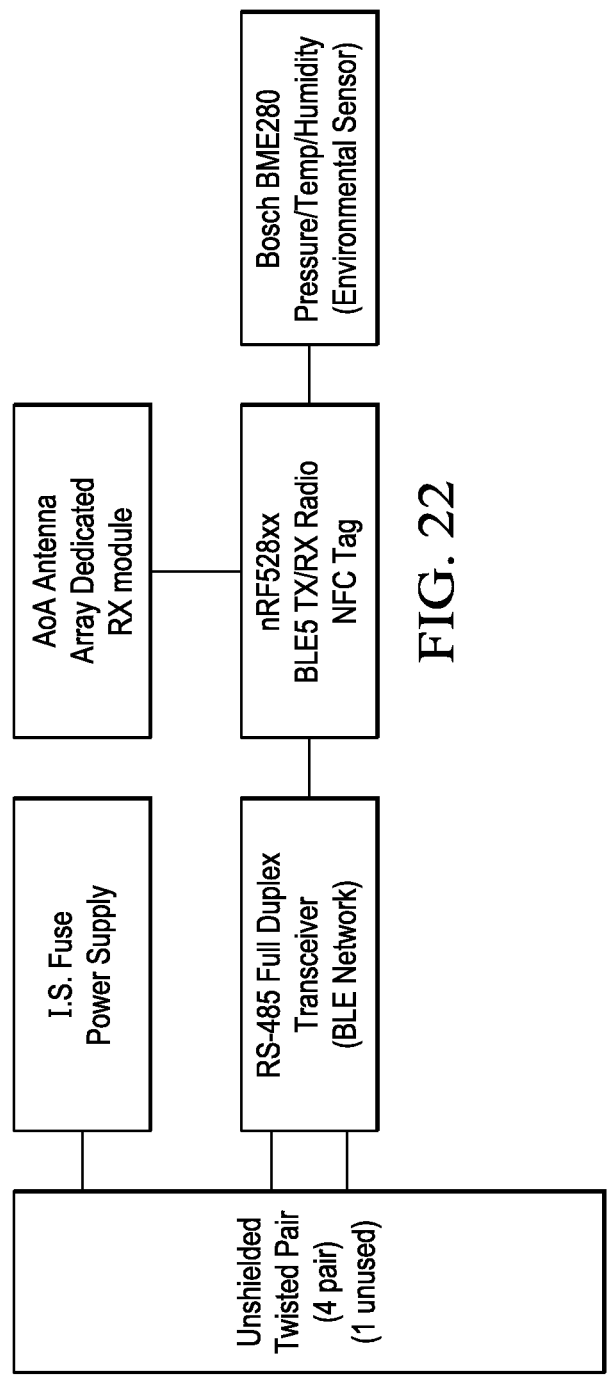
Figure 23:
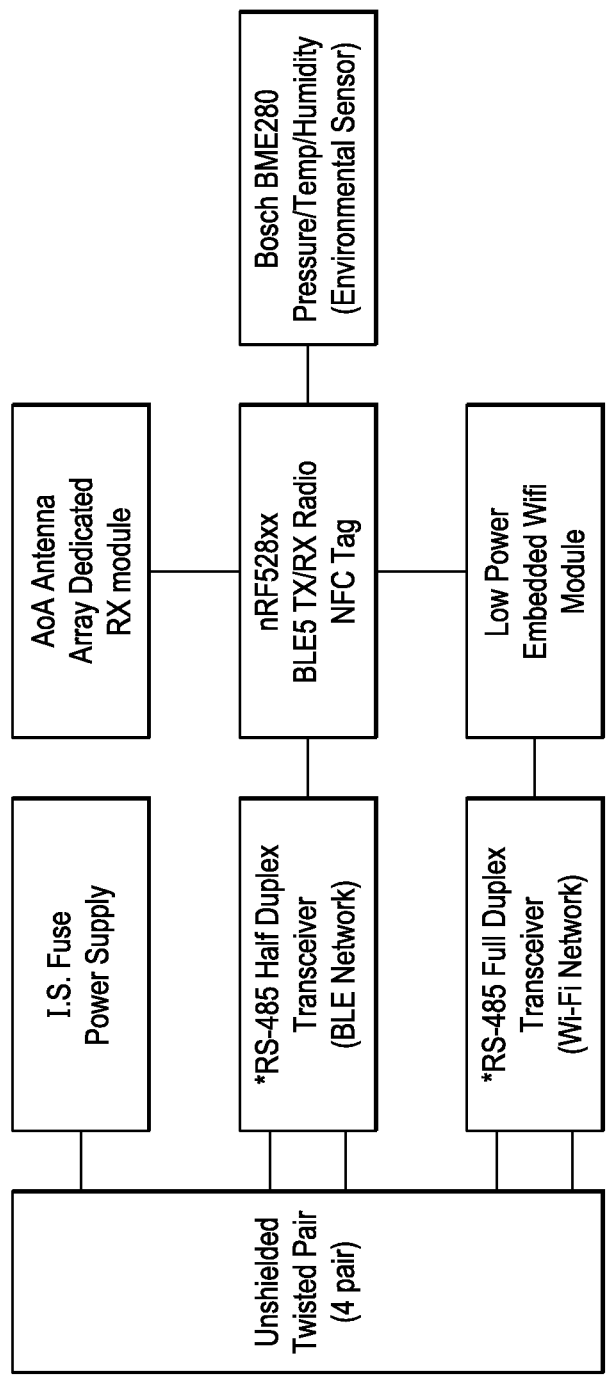
Figure 24:
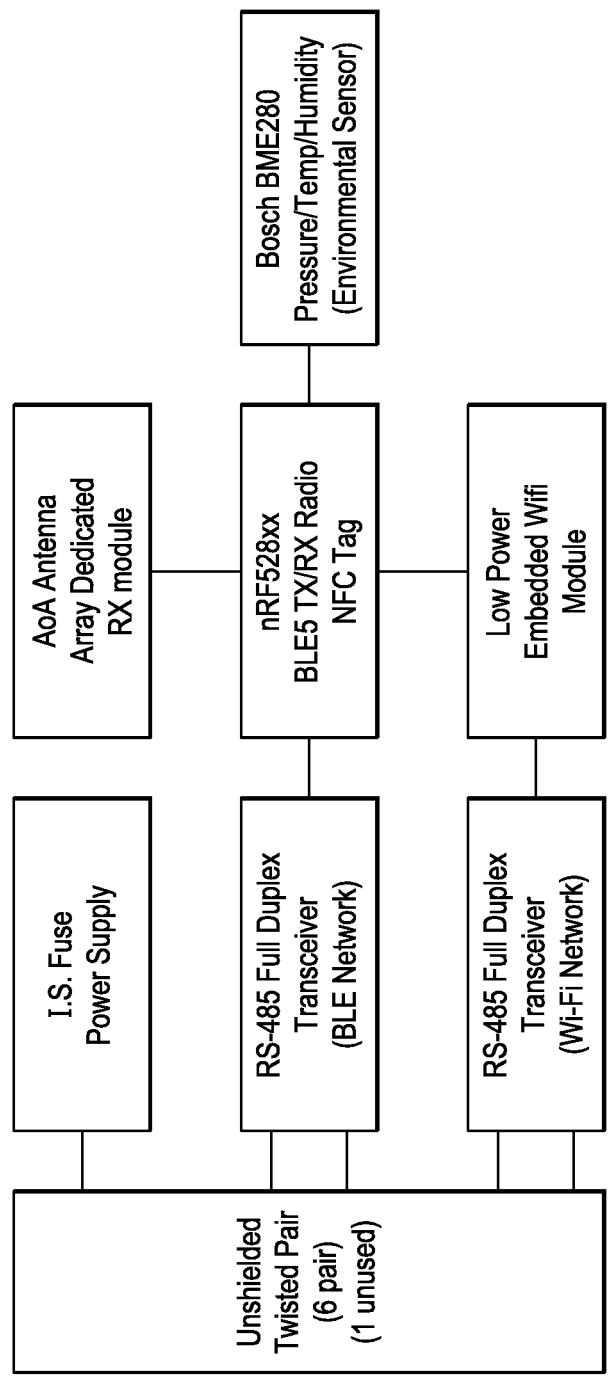

Now referring to FIG. 11, in an embodiment, the system may include a gateway 60 that allows a local network to access the remote monitoring system. The gateway may be in communication with one or more nodes, as discussed below, and a database, such as a cloud database. The gateway allows for data from the sensor devices to be sent through lightning proof, surge protection barriers to communications gear housed outside the hazardous zones of, for example, the rickhouse or warehouse. An enclosure can house the gateway and any endpoints for serial ports for the nodes in the system, as discussed further below. The gateway may utilize different connection technologies including Wi-Fi, a cellular network, a satellite, or a wired connection (e.g., hardwired into a local network). The gateway may be a custom gateway or a commercially available gateway. A suitable example of a gateway includes a Dell Edge Gateway 5000.

With reference to FIGS. 12-20, in an embodiment, the system may include one or more nodes 70 that receive sensor data from sensor devices and communicate that data to a remote device (e.g., a gateway). Each node may be in wireless communication with one or more sensor devices. In an embodiment, the nodes have a fixed location. For example, each node may be coupled to a building structure (e.g., in a warehouse or rickhouse) using fasteners, such as stainless steel screws (e.g., less than 3 inches), or by being removably mounted to a fixed bracket. The nodes may utilize different connection technologies including wireless connections (e.g., RF, BLE, LoraWAN, Wi-Fi, a cellular network, a satellite, etc.) or wired connections (e.g., low-voltage cabling such as RS482, RS485, copper or fiber optics, half or full duplex, etc.). In an embodiment using a wired connection, each node may be connected to an outside communications box (e.g., via the serial ports discussed above). Additionally, the nodes may be powered through the wired connection. For example, the nodes may be powered using power over Ethernet (POE) technology (e.g., up to 24V), and more than one node may be powered by the same cable. In an embodiment, the nodes can download sensor data from the sensor devices every 6 hours, every 12 hours, or every 6 to 12 hours. The nodes are configured to send data from the one or more sensor devices and optionally the environmental data of the node surroundings to the gateway or directly to a database (e.g., a cloud database).

FIGS. 21-24 show depictions of various depict relay node electronic block diagrams. In an embodiment, a node may be capable of monitoring, for example, environmental data (e.g., air temperature, barometric pressure, and/or humidity) at its location, which can be incorporated with the environmental data from one or more sensor devices. The depicted relay node of FIG. 21 includes a POE connection providing power and data connection to the relay, to power a BLE transceiver, NFC receiver, and sensor array including, for example, a pressure sensor, temperature sensor, humidity sensor, and other sensors. The depicted relay node of FIG. 22 includes all of the features of that shown in FIG. 21, and additionally includes an antenna array to aid in the receipt and/or transmission of wireless signals. The depicted relay node of FIG. 23 includes all of the features of that shown in FIG. 22, and additionally includes a lower power Wi-Fi transceiver. The depicted relay node of FIG. 24 includes all of the features of that shown in FIG. 23, and additionally includes a more robust POE connection to provide additional data and power communication to the relay node.

Figure 25:
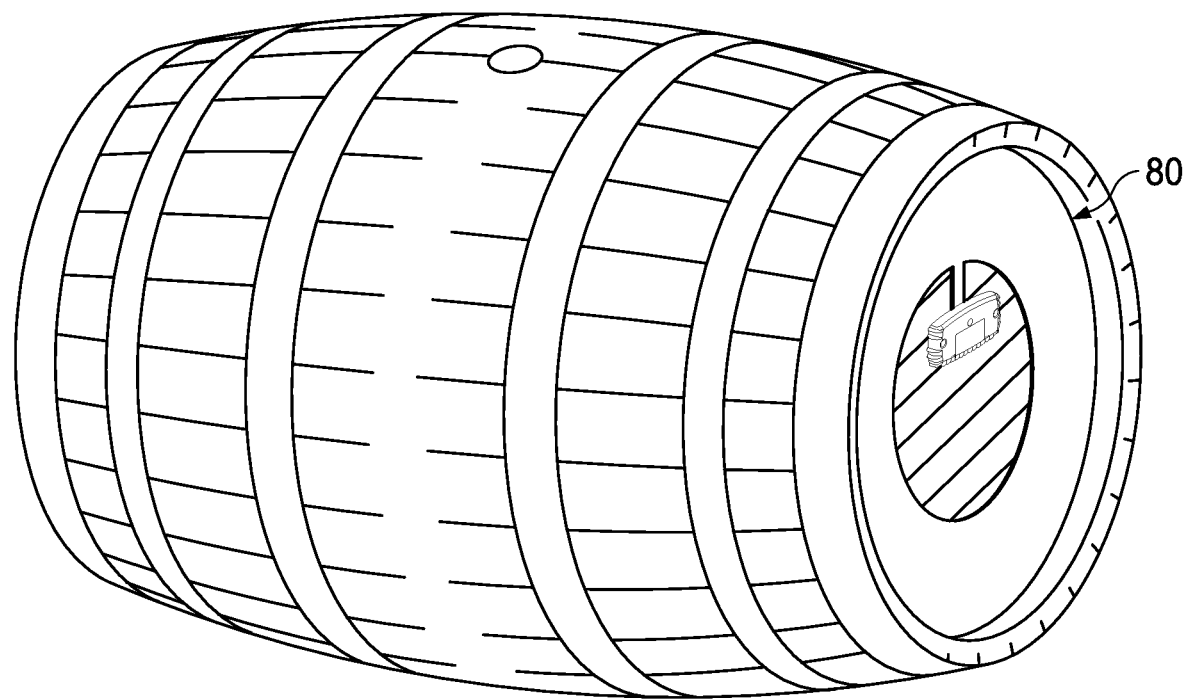
FIGS. 25-27 schematically depict a barrel including a volume sensor in accordance with various non-limiting embodiments.
Figure 26:
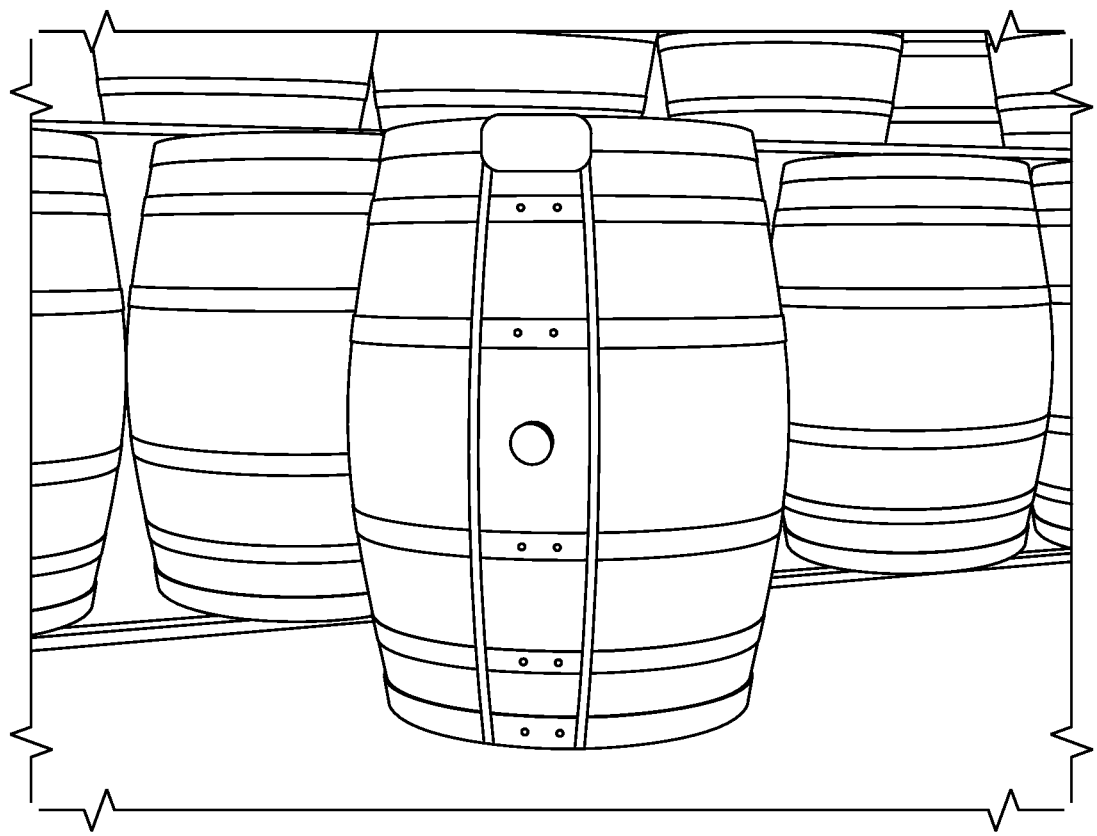
Figure 27:
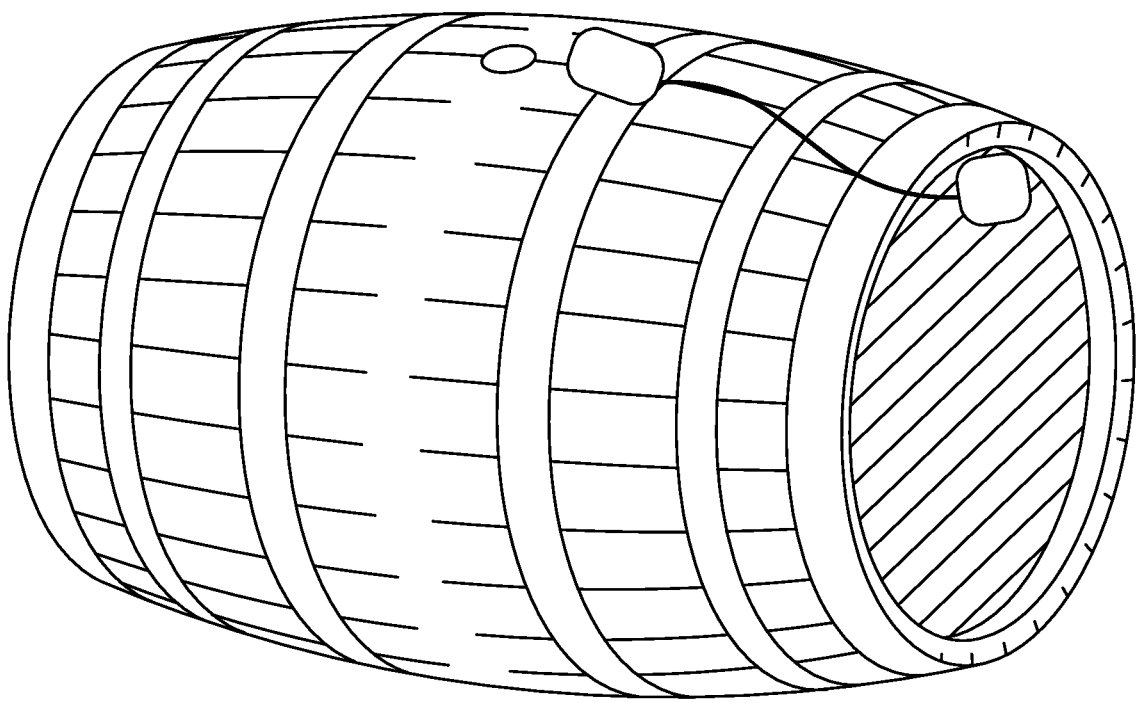

With reference to FIGS. 25-27, in various embodiments, the system may include a sensor device configured to measure a volume inside a container. In some embodiments, the measurements may be taken from outside of the container. The sensor device may be coupled to, for example, an electrode array 80 and may be capable of measuring relative capacitance between sets of electrodes in the electrode array. The electrode array may include low-voltage capacitive sensors. The capacitive sensors may be powered by the sensor device. In various embodiments, volume measurements may be made once a day, once every 12 hours, once every 6 hours, once every 2 hours, once every hour, or once every 10 minutes, among other suitable intervals that provide sufficient data granularity. The volume data may be communicated in the same manner as the sensor data discussed above.

In an embodiment, as shown in FIG. 25, the electrode array may be positioned on the outside of the container on the head of the barrel. The electrode array may have a circular pattern. Where the barrel is stored horizontally, the relative capacitance between sets of electrodes on the same horizontal plane may be measured. There should be a noticeable difference in capacitance between the electrode pairs at levels that have liquid between them compared to those that have air between them, allowing the liquid level in the container to be determined. Where the container is an irregular shape, such as a barrel, the electrode array on the head of the barrel may not be able to determine the level of the liquid if it is above the head (i.e., because all electrode pairs are covered in liquid) or below the head (i.e., because all electrode pairs are exposed to air). The number of electrodes in the electrode array may vary. While the greater the number of electrodes will result in greater accuracy, the number of electrodes may be determined based on the available space for the electrodes and connections to the sensor device (e.g., wiring). The sensor device may be able to calibrate the capacitance signals if the electrode array is off center (e.g., if the electrode pairs are not evenly aligned). In an example, the array may include 48 electrodes spaced out equally along the array (e.g., with a spacing of 0.5 inch) that allows for measuring the volume between about 5% to about 95% capacity with an accuracy of +/− about 3%. Table 1 shows an example of how a series of electrodes may be spaced along the head of a barrel and the corresponding volumes for each height. The example in Table 1 includes levels that cannot be measured by the electrodes on the head (e.g., above and below the head).

TABLE 1

|  | Inches Above Min | Inches Below Max | Volume (gal) | Volume Step (gal) | % Full | % Step |
| --- | --- | --- | --- | --- | --- | --- |
| Max Capacity (24.125 inches) | 24.125 | 0.0 | 53.05 |  | 100.00% | 0.17% |
|  | 23.625 | 0.5 | 52.96 |  | 99.83% | 0.51% |
|  | 23.125 | 1.0 | 52.69 | 0.36 | 99.32% | 0.83% |
|  | 22.625 | 1.5 | 52.25 |  | 98.49% | 1.15% |
|  | 22.125 | 2.0 | 51.65 | 1.05 | 97.35% | 1.40% |
|  | 21.625 | 2.5 | 50.90 | 0.74 | 95.95% | 1.60% |
| Maximum head measurement (21.56 inches) | 21.125 | 3.0 | 50.05 | 0.85 | 94.35% | 1.76% |
|  | 20.625 | 3.5 | 49.12 | 0.93 | 92.59% | 1.90% |
|  | 20.125 | 4.0 | 48.11 | 1.01 | 90.68% | 2.02% |
| Half Capacity | 19.625 | 4.5 | 47.04 | 1.07 | 88.66% | 2.13% |
| Minimum head measurement (2.56 inches) | 19.125 | 5.0 | 45.91 | 1.13 | 86.53% | 2.23% |
|  | 18.625 | 5.5 | 44.73 | 1.18 | 84.30% | 2.31% |
|  | 18.125 | 6.0 | 43.50 | 1.23 | 81.99% | 2.39% |
|  | 17.625 | 6.5 | 42.23 | 1.27 | 79.60% | 2.46% |
|  | 17.125 | 7.0 | 40.93 | 1.30 | 77.15% | 2.52% |
|  | 16.625 | 7.5 | 39.59 | 1.34 | 74.63% | 2.57% |
|  | 16.125 | 8.0 | 38.23 | 1.36 | 72.06% | 2.62% |
|  | 15.625 | 8.5 | 36.84 | 1.39 | 69.44% | 2.66% |
|  | 15.125 | 9.0 | 35.43 | 1.41 | 66.79% | 2.69% |
|  | 14.625 | 9.5 | 34.01 | 1.43 | 64.10% | 2.72% |
|  | 14.125 | 10.0 | 32.57 | 1.44 | 61.38% | 2.74% |
|  | 13.625 | 10.5 | 31.11 | 1.45 | 58.64% | 2.76% |
|  | 13.125 | 11.0 | 29.65 | 1.46 | 55.89% | 2.77% |
|  | 12.625 | 11.5 | 28.18 | 1.47 | 53.12% | 2.77% |
|  | 12.125 | 12.0 | 26.71 | 1.47 | 50.35% | 0.35% |
|  | 12.0625 | 12.1 | 26.53 | 0.18 | 50.00% | 2.43% |
|  | 11.625 | 12.5 | 25.24 | 1.47 | 47.57% | 2.77% |
|  | 11.125 | 13.0 | 23.77 | 1.47 | 44.80% | 2.76% |
|  | 10.625 | 13.5 | 22.31 | 1.46 | 42.04% | 2.74% |
|  | 10.125 | 14.0 | 20.85 | 1.46 | 39.30% | 2.72% |
|  | 9.625 | 14.5 | 19.40 | 1.44 | 36.58% | 2.70% |
|  | 9.125 | 15.0 | 17.97 | 1.43 | 33.88% | 2.66% |
|  | 8.625 | 15.5 | 16.56 | 1.41 | 31.21% | 2.63% |
|  | 8.125 | 16.0 | 15.17 | 1.39 | 28.59% | 2.58% |
|  | 7.625 | 16.5 | 13.80 | 1.37 | 26.01% | 2.53% |
|  | 7.125 | 17.0 | 12.46 | 1.34 | 23.48% | 2.47% |
|  | 6.625 | 17.5 | 11.14 | 1.31 | 21.01% | 2.41% |
|  | 6.125 | 18.0 | 9.87 | 1.28 | 18.60% | 2.33% |
|  | 5.625 | 18.5 | 8.63 | 1.24 | 16.27% | 2.25% |
|  | 5.125 | 19.0 | 7.44 | 1.19 | 14.02% | 2.16% |
|  | 4.625 | 19.5 | 6.29 | 1.14 | 11.86% | 2.05% |
|  | 4.125 | 20.0 | 5.20 | 1.09 | 9.81% | 1.93% |
|  | 3.625 | 20.5 | 4.18 | 1.03 | 7.88% | 1.80% |
|  | 3.125 | 21.0 | 3.23 | 0.95 | 6.08% | 1.64% |
|  | 2.625 | 21.5 | 2.35 | 0.87 | 4.44% | 1.46% |
| Empty (0 inches) | 2.125 | 22.0 | 1.58 | 0.77 | 2.98% | 1.22% |
|  | 1.625 | 22.5 | 0.94 | 0.65 | 1.76% | 0.91% |
|  | 1.125 | 23.0 | 0.45 | 0.48 | 0.85% | 0.59% |
|  | 0.625 | 23.5 | 0.14 | 0.31 | 0.27% | 0.26% |
|  | 0.125 | 24.0 | 0.01 | 0.14 | 0.01% | 0.01% |
|  | 0.000 | 24.1 | 0.00 | 0.01 | 0.00% | 0.00% |

Referring to FIG. 26, in an embodiment, the electrode array may be positioned on the outside of the container along the side of the container. The electrode array may have a linear pattern. Where the barrel is stored vertically, the relative capacitance between sets of electrodes on the same horizontal plane may be measured. Such a configuration may allow for measuring the volume between about 0% to about 100%. In an example, 60 electrodes may be spaced out equally along the array (e.g., with a spacing of 0.5 inch) that allows for measuring the volume between about 0% to about 100% capacity with an accuracy of +/− about 2%. Where the material of the container changes along the height (e.g., where a hoop is positioned), the readings may be affected. Accordingly, there may be some spots in the container that have lower data resolution.

Referring to FIG. 27, in an embodiment, the sensor device may be coupled to a precision volume sensor. The precision volume sensor could be magnetically attached to the container (e.g., the bilge hoop of a barrel, approximately in line with the bung hole) where it would be able to send signals down through the air and liquid and measure the reflected signal allowing the liquid level to be read accurately (e.g., using radar technology). Such a configuration may allow for measuring the volume between about 0% to about 100% (e.g., with an accuracy of +/− about 1%). The precision volume sensor may be manually attached after the barrel is stored (e.g., set in the rack). If the barrel is to be moved, the precision volume sensor may be manually detached and stowed and then manually re-attached when the barrel is set back in the rack.

Some implementations of the disclosed sensor devices, such as those shown in FIGS. 4-10 and 26-27, may include additional features. As an example, some sensor devices may be configured to enter a sleep state in which every power consuming component except for the accelerometer and/or a portion of a processor or controller is disabled or placed in a low-power mode. In this manner, the sensor device may conserve power and only exit the sleep state in certain scenarios. This may include, for example, intermittently (e.g., based on a static or dynamic schedule) waking to check barrel status and transmit data. This may also include, for example, waking in response to a signal from the accelerometer indicating that the sensor device is in motion, or has undergone a change in its position and/or orientation. In this manner, when motion of the sensor device is detected, the device may wake to check the barrel status and transmit data outside of any configured schedule. Notifications related to unscheduled waking may be displayed on a dashboard or interface, or may be provided to one or more devices in the form of an emergency notification (e.g., a persistent audible or visual alert provided via a mobile device software application or other device).

Such notifications may also indicate the extent and type of movement that was detected and any related change in the barrel status. For example, where motion of the sensor device is detected but barrel status cannot be read, the notification may indicate that the sensor device has become unattached from the barrel. Where motion is detected followed by a change in the volume of liquid in the barrel, the notification may indicate that the barrel is leaking or has undergone a drastic change in its orientation (e.g., such as displacement due to failure of a rack or support structure). The notification may also be provided in the context of notifications from nearby sensor devices. For example, this may include a notification indicating that several sensor devices positioned on adjacent barrels have all reported similar unanticipated motion, which may indicate a localized failure of a rack or support structure, tampering and/or theft by a third party, or other circumstances.

Some implementations of the sensor devices may also be configured to provide more than basic point-to-point wireless communication between devices (e.g., between a sensor device and a relay, gateway, or other device). For example, in some implementations the sensor device and/or a relay or other device may be configured to use perceived signal strength, barometric pressure signals from the sensor device, and temperature signals from the sensor device, or other sensor device information to determine the location (e.g., position and elevation) of a sensor device within the environment. This may be used as an alternative to, or an enhancement to wireless triangulation techniques, and so may be used to verify and/or improve the accuracy of one or both. Some implementations of the sensor devices may also be configured to operate in a one-way, non-transactional communication method, such that signals are broadcast without regard to whether their receipt is confirmed. In this manner, the wireless broadcast component may be powered very briefly to transmit a signal, without attempting to establish a confirmed connection or waiting for a response signal. This significantly reduces the time that the sensor device is awake, as well as the associated energy consumption.

A significant advantage of several of the disclosed sensor devices is avoidance of the need for complex calibration, fine tuning, or re-calibration of sensing components. For example, it will be appreciated, by those skilled in the art and in light of this disclosure, that volume sensors using capacitive technology may be statically configured to detect the presence of absence of liquid, and so do not require calibration upon placement on a barrel, or regular re-calibration due to various environmental factors over time.

In some implementations of the sensor device, such as those shown in FIGS. 26 and 27 for example, the sensor devices built in capabilities may be configured to be usable during placement of the sensor on a barrel. For example, with reference to the sensor device of FIG. 26, the sensor device may be placed into an install mode state where the accelerometer is actively used to guide alignment of the array of sensors placed along the length of the barrel. In this manner, the sensor device may provide audible or visual feedback indicating which sensors of the array, if any, need to be repositioned.

In some implementations of the disclosed system, network communications between devices may be configured to minimize the data footprint that is transmitted. This may improve the accuracy of data transmitted in low connectivity conditions, and also reduce the power consumption associated with data transmission. Such configurations may include, for example, the sensor device being configured to omit unnecessary data (e.g., sensor data that substantially matches a previously reported value, sensor data that is produced by a sensor but is unused due to a user configuration of the system), or encode data to reduce its size (e.g., structuring the data based on sequence of values instead of by association with parameter names or identifiers). Such configurations may also include using a REST API to handle communications, using a Lambda function to reduce communication size, or using an MQTT protocol to reduce impact.

The following examples are included to illustrate certain aspects and embodiments of the present disclosure. These examples are provided by way of illustration and are not meant to be limiting.

Example 1

The following describes an example power measurement setup and empirical data obtained from measuring the current draw during different phases of operation. The current measurements were taken using an NRF6707 Power Profiler Kit from Nordic Semiconductor. To obtain the power data in a reasonable amount of time the normal operating cycle was advanced to reduce the idle time between connection events and sensor readings. The operating cycle was advanced as shown in Table 2:

TABLE 2

| Operation | Normal | Testing |
| --- | --- | --- |
| Advertise for Connection | Every 5 minutes | Every 10 seconds |
| Sensor Reading | Every Hour | Every Minute |
| Advertise Sensor Data | Every 20 minutes | Every 20 seconds |

The battery terminals of a sensor device were connected to the "External DUT" pins on the Nordic nRF6707 Power Profiler Kit and powered by a Keysight E3643A DC Power Supply. The power supply was connected at the "External Supply" pins on the Power Profiler Kit to power all devices. The Power Profile Kit was connected to a Nordic nRF52832 Development Kit, which was connected to the PC via USB. The switches on the Power Profiler Kit were also set as follows. SW2 and SW4 set to "External" and SW 3 set to "DK".

Figure 28:
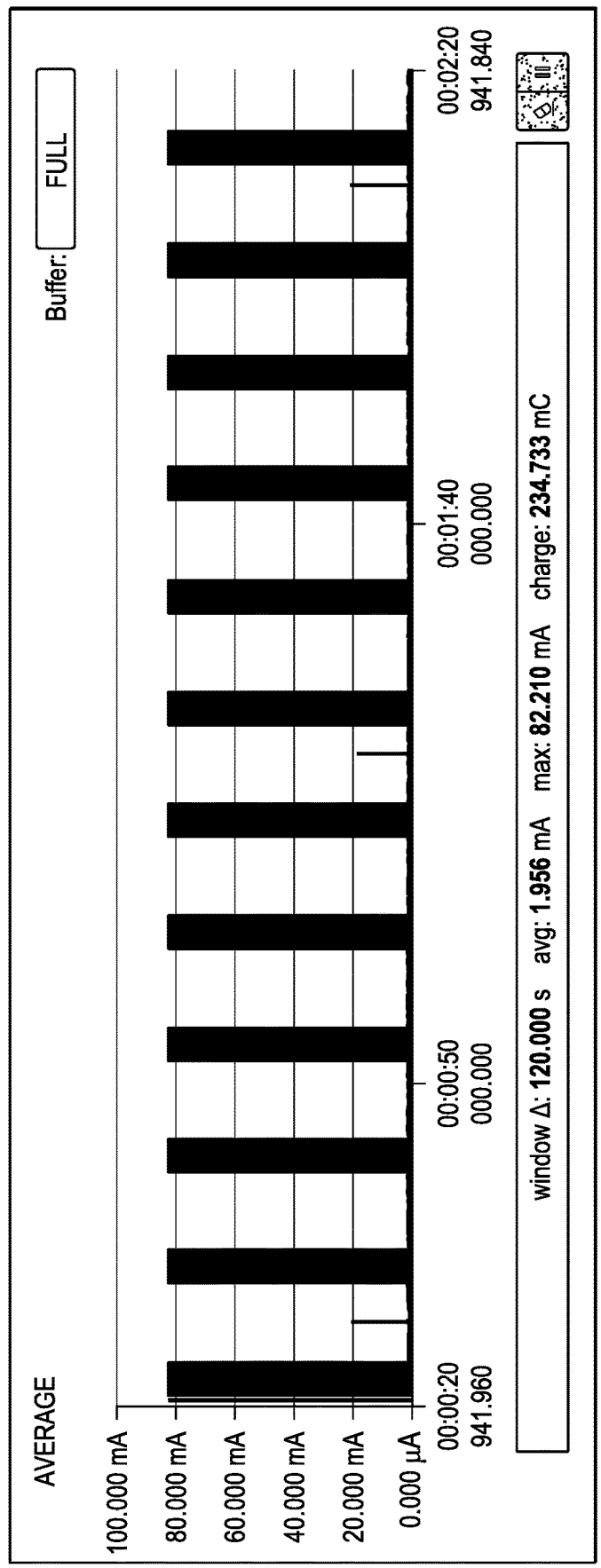
FIGS. 28-39 are current profile charts.

FIG. 28 depicts the current profile of the sensor device during normal operation for 12 advertising intervals, occurring every 10 seconds for testing purposes. An advertising interval consists of the beginning of an advertisement to the end of the proceeding idle state. The sensor device advertises for three seconds and remains in an idle state for 7 seconds. Every 4th advertisement contains sensor data. The small spike at the beginning is due to the initialization of the system. The random short blips were determined to be caused by the accelerometer. Table 3 shows the measurements of the 12 advertising intervals from start up, and Table 4 shows the measurements on the power consumed in the steady state intervals.

TABLE 3

| Interval | Time (s) | Avg Current (mA) | Max Current (mA) | Charge (mC) |
| --- | --- | --- | --- | --- |
| ADV 1 | 2.992 | 6.625 | 82.21 | 19.825 |
| ADV 2 | 2.995 | 6.815 | 82.21 | 20.404 |
| ADV 3 | 2.988 | 6.006 | 82.21 | 17.945 |
| ADV 4 | 2.992 | 6.073 | 82.21 | 18.17 |

TABLE 3-continued

| Interval | Time (s) | Avg Current (mA) | Max Current (mA) | Charge (mC) |
|---|---|---|---|---|
| ADV 5 | 2.99 | 6.086 | 82.21 | 18.194 |
| ADV 6 | 2.983 | 6.3 | 82.21 | 18.792 |
| ADV 7 | 2.991 | 5.995 | 82.21 | 17.815 |
| ADV 8 | 2.981 | 6.018 | 82.21 | 17.938 |
| ADV 9 | 3.002 | 5.813 | 82.21 | 17.453 |
| ADV 10 | 2.976 | 6.505 | 82.21 | 19.358 |
| ADV 11 | 2.986 | 5.947 | 82.21 | 17.76 |
| ADV 12 | 2.994 | 5.984 | 82.21 | 1.909 |
| Mean | | 6.180333333 | 82.21 | 17.13025 |
| Median | | 6.0455 | 82.21 | 18.0575 |

TABLE 4

| Interval | Time (s) | Avg Current (mA) | Max Current (mA) | Charge (mC) |
|---|---|---|---|---|
| Steady State 1 | 7.008 | 0.156844 | 20.997 | 1.099 |
| Steady State 2 | 6.962 | 0.1557821 | 1.693 | 1.085 |
| Steady State 3 | 6.989 | 0.155885 | 1.642 | 1.09 |
| Steady State 4 | 6.984 | 0.155814 | 1.702 | 1.088 |
| Steady State 5 | 6.955 | 0.155986 | 1.664 | 1.085 |
| Steady State 6 | 6.981 | 0.157079 | 19.192 | 1.097 |
| Steady State 7 | 7.014 | 0.155885 | 1.7 | 1.093 |
| Steady State 8 | 6.985 | 0.155625 | 1.681 | 1.087 |
| Steady State 9 | 6.977 | 0.15563 | 1.658 | 1.087 |
| Steady State 10 | 7.011 | 0.155714 | 1.65 | 1.092 |
| Steady State 11 | 6.99 | 0.157013 | 21.304 | 1.098 |
| Steady State 12 | 5.716 | 0.15498 | 1.679 | 0.885915 |
| Mean | | 0.156019758 | 6.380166667 | 1.073909583 |
| Median | | 0.1558495 | 1.687 | 1.089 |

The bolded values in Table 3 are those where the sensor data was present in the advertisement. The bolded values in Table 4 are those that contain energy consumed by the accelerometer.

Figure 29:
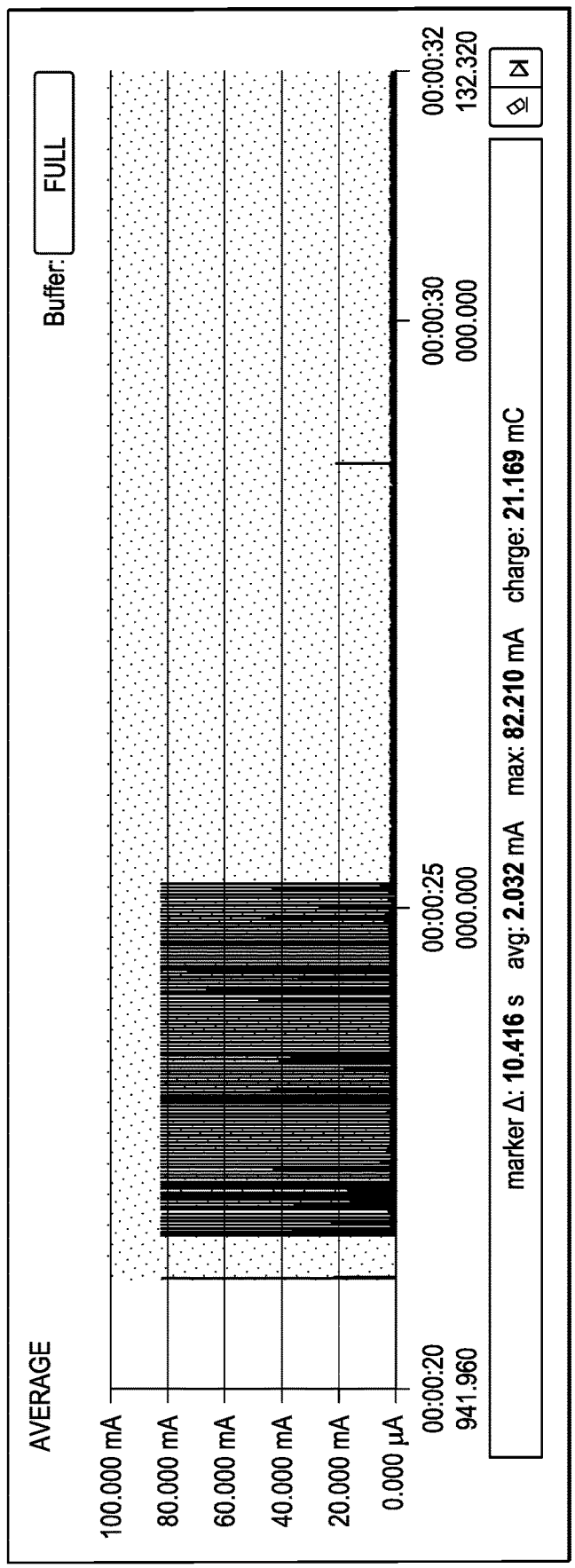
Figure 30:
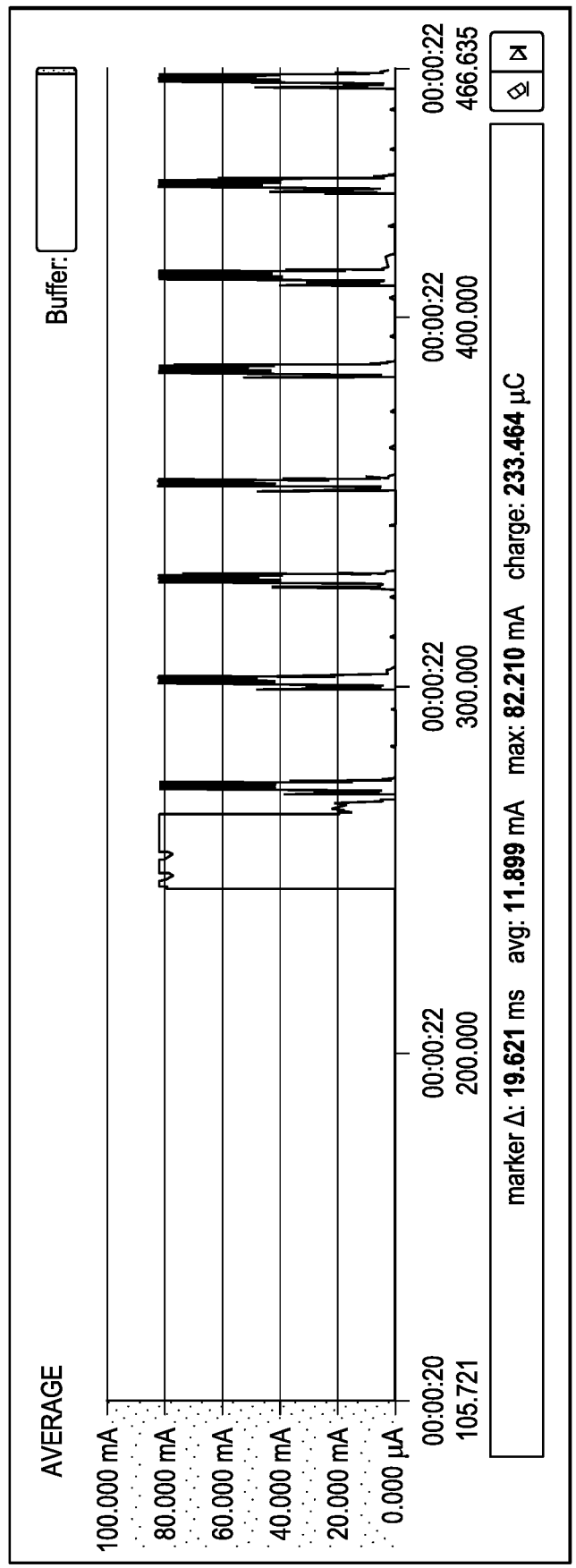
Figure 31:
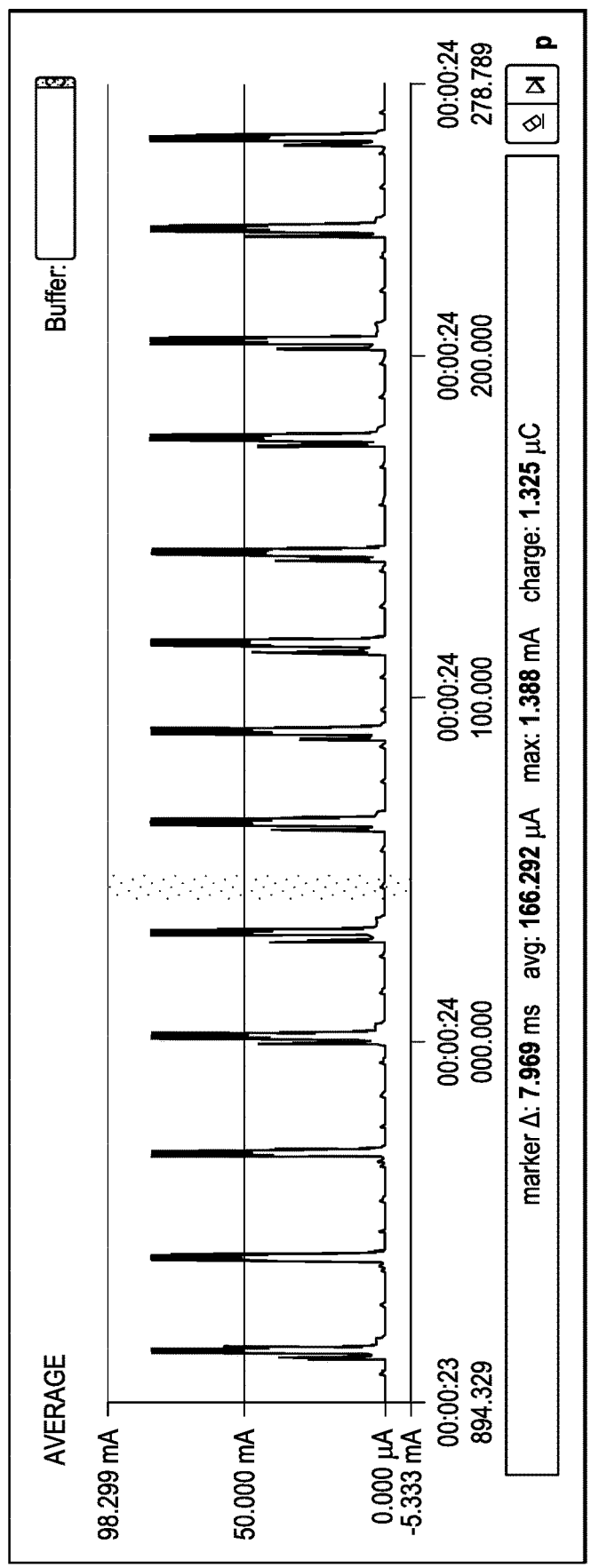
Figure 32:
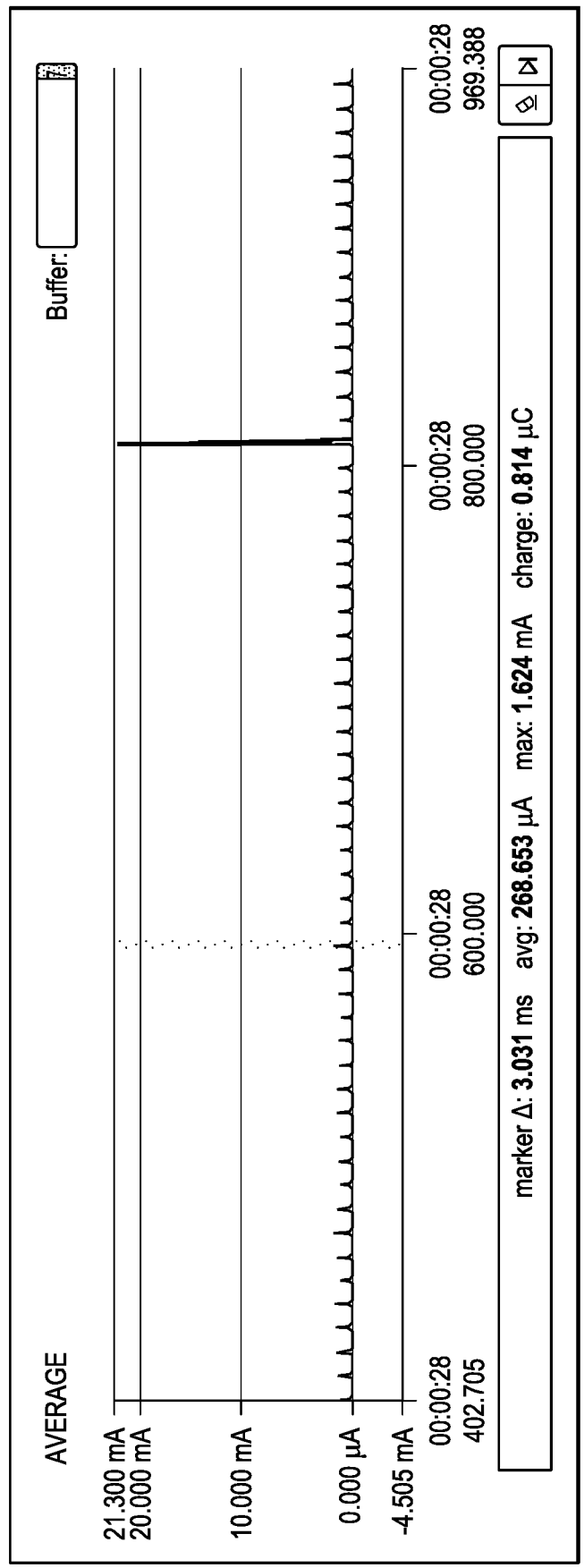

Advertising Interval 1 and Start Up. FIG. 29 shows the power-up, the 1st advertising interval, and the following steady state time. FIG. 30 emphasizes the advertisements and shows the consumption from reading the sensor data and the advertisements. The sensor initialization is the large waveform at the beginning of the advertisement. The large repeating spikes are the advertisements. The accelerometer causes the small spikes seen in between the advertisements. FIG. 31 shows the accelerometer current usage highlighted. FIG. 32 emphasizes the steady state current after the first advertisement. The highlighted current spikes have been determined to be generated by the accelerometer. The larger spike is also due to the accelerometer.

Figure 33:
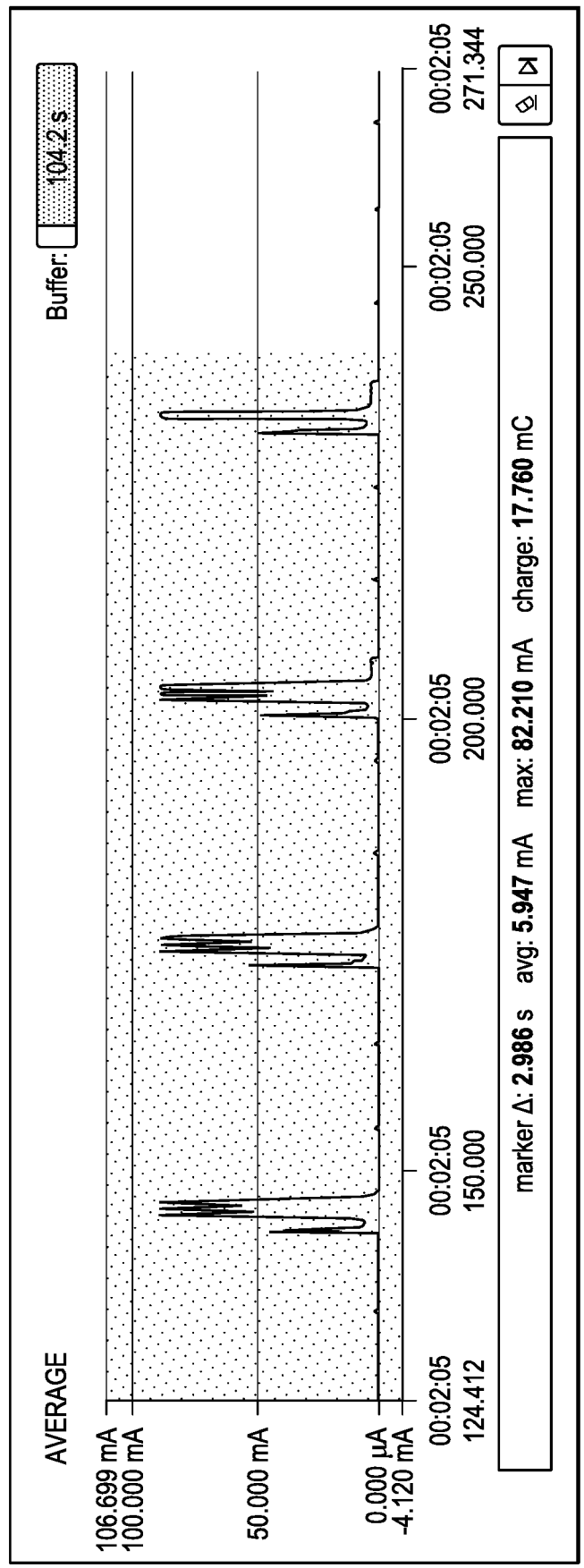
Figure 34:
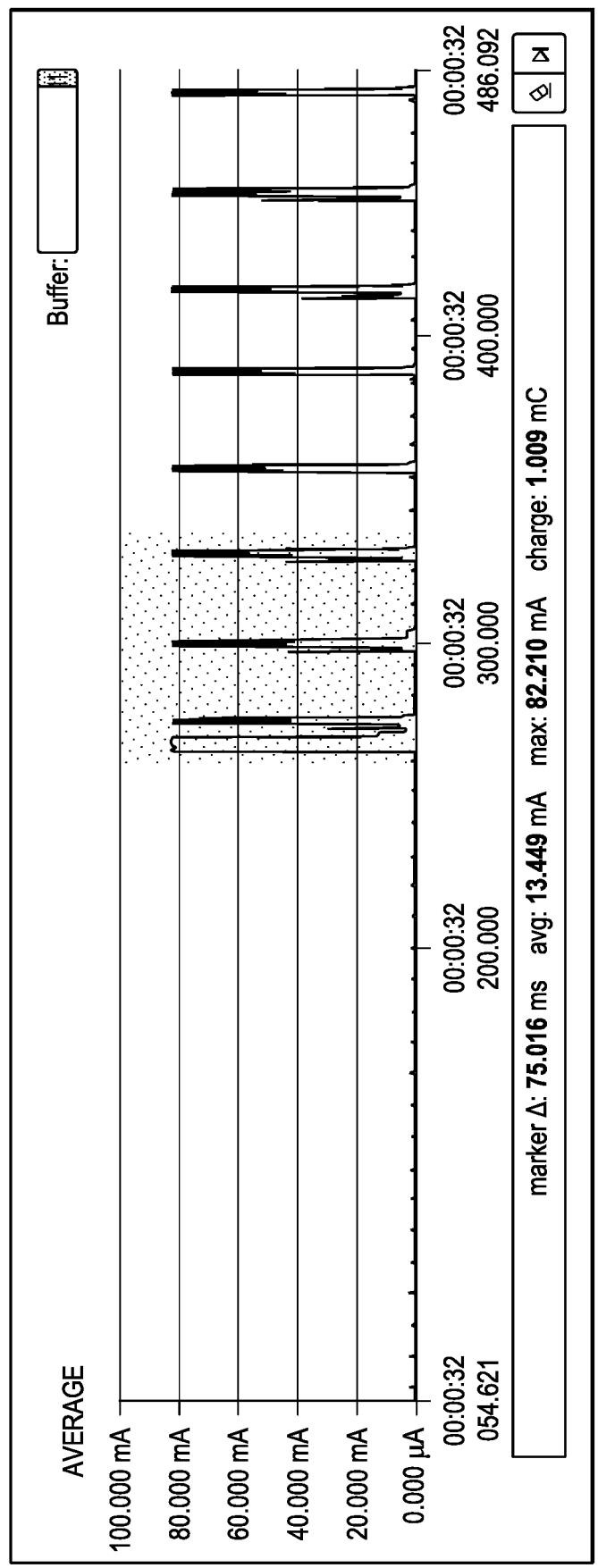
Figure 35:
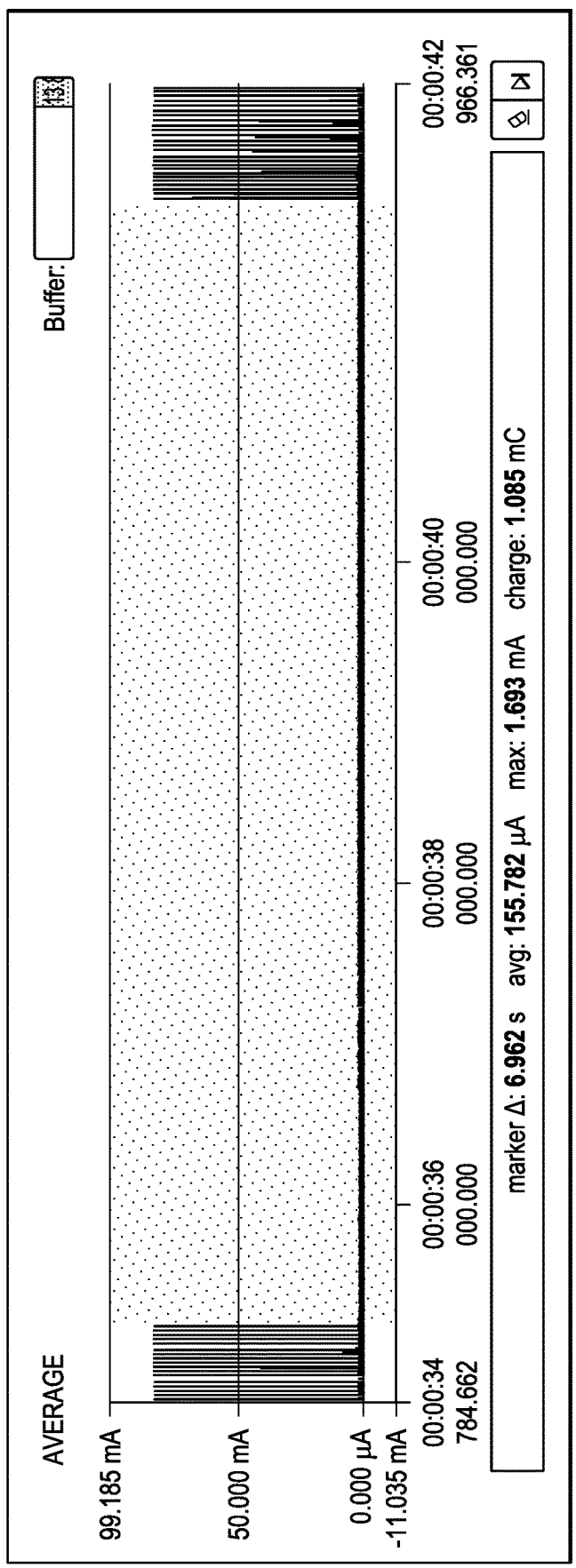
Figure 36:
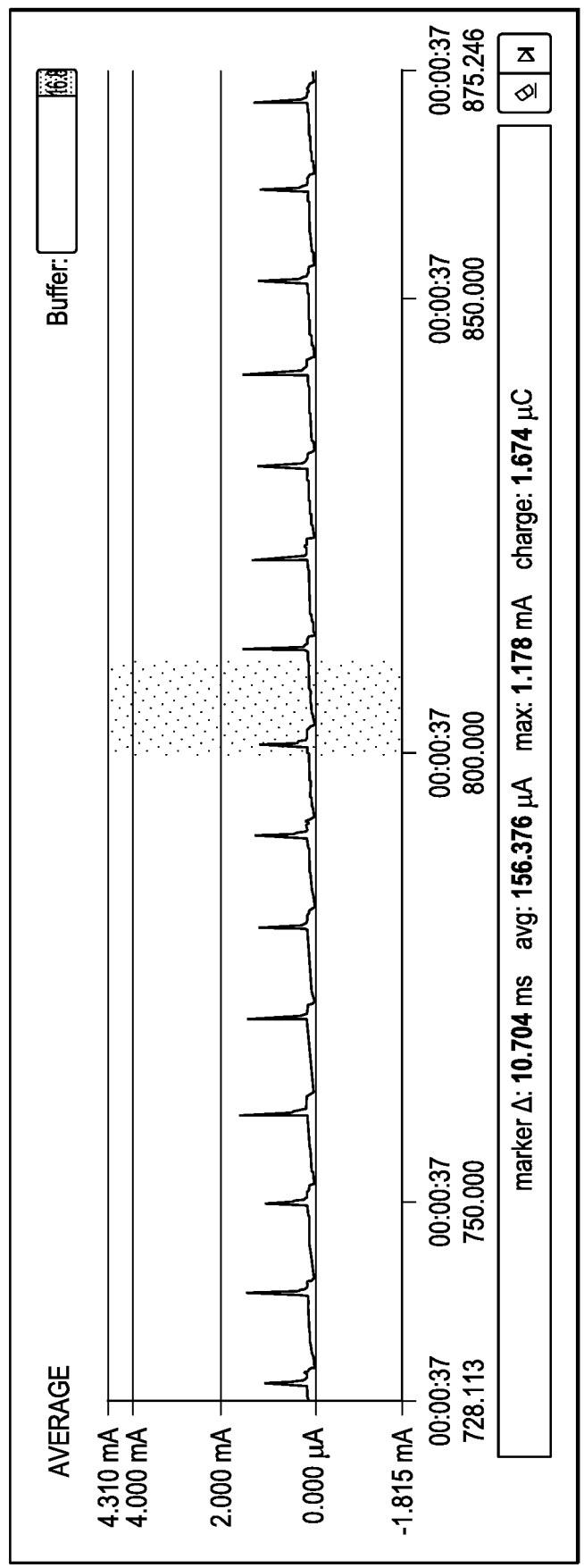

Advertising Interval. FIG. 33 emphasizes a section of an advertisement train. The preceding spike is due to the powering up of the radio. This is followed by the transmission of the advertisement data on 3 separate channels. FIG. 34 shows a sensor reading as large waveform at beginning of the advertising. FIG. 35 shows a steady state. FIG. 36 emphasizes the steady state and provides a detailed look at accelerometer current spikes.

Figure 37:
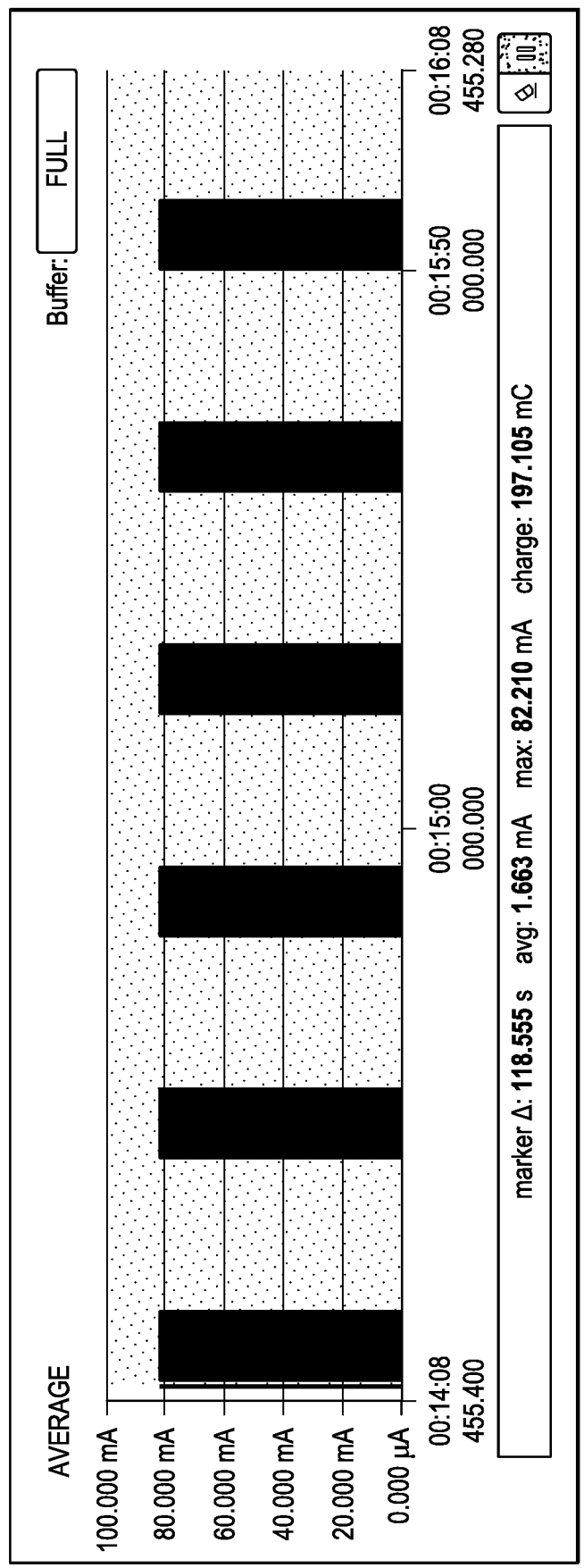
Figure 38:
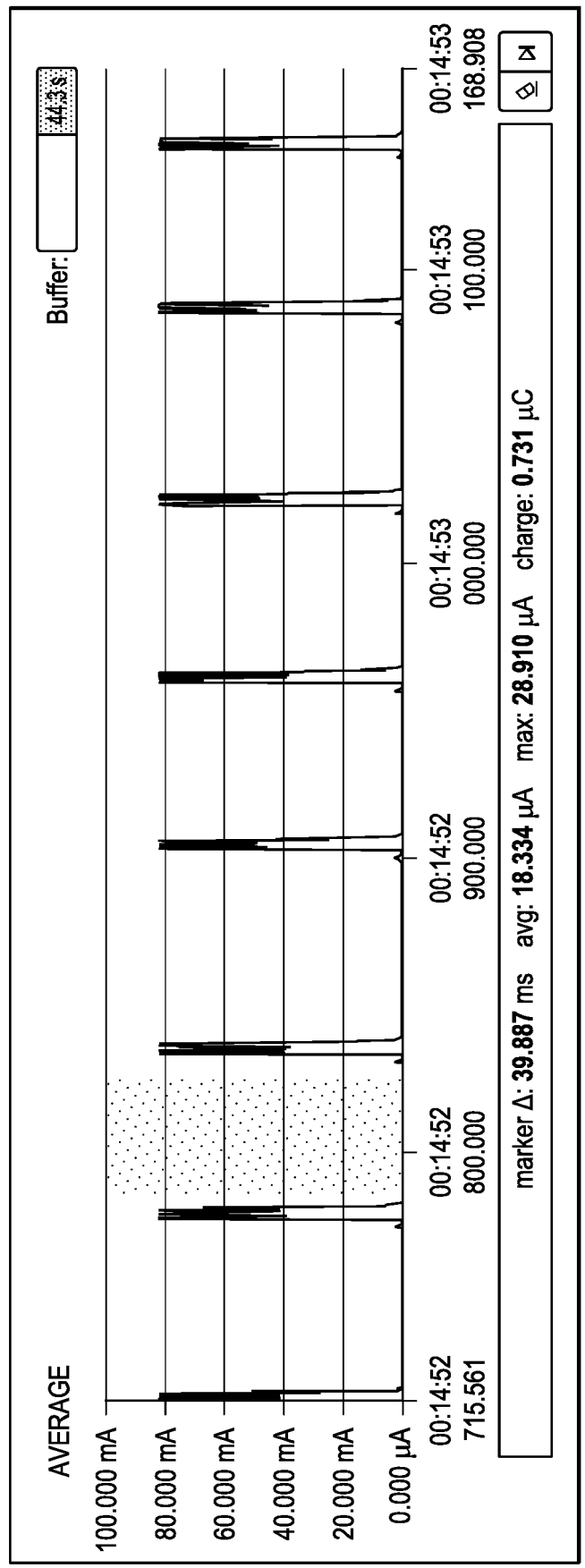

Accelerometer Off. To verify the extra power consumption was caused by the accelerometer, the initialization of the accelerometer was disabled. FIG. 37 shows the power consumption with the accelerometer turned off. FIG. 38 shows the advertising interval with the accelerometer turned off. FIG. 38 shows the frequent current spikes disappeared. Table 3 shows the average current draw with various sensor combinations during the steady state interval.

TABLE 3

| Idle State Mode | Average Current | Max Current |
|---|---|---|
| No Sensors | ~20 µA | ~34 µA |
| Temp/Pressure | 20 µA | 35 µA |
| Accelerometer | 156 µA | 1739 µA |

Notifying Sensor Data. The sensor data can be pulled from the sensor device by enabling Notifications of the sensor data characteristic. The process for pulling the data is: (1) Connect to the sensor device; (2) Enable Notifications at Handle 0x0E (Known handle, no discovery needed); (3) Wait for notifications to complete (this will vary depending on the number of readings being notified); (4) Clear the readings by writing 0x1097 to handle 0x0D; and (5) Disconnect. This process is proposed to occur once every 24 hours, and thus, 24 sensor readings would be notified.

Figure 39:
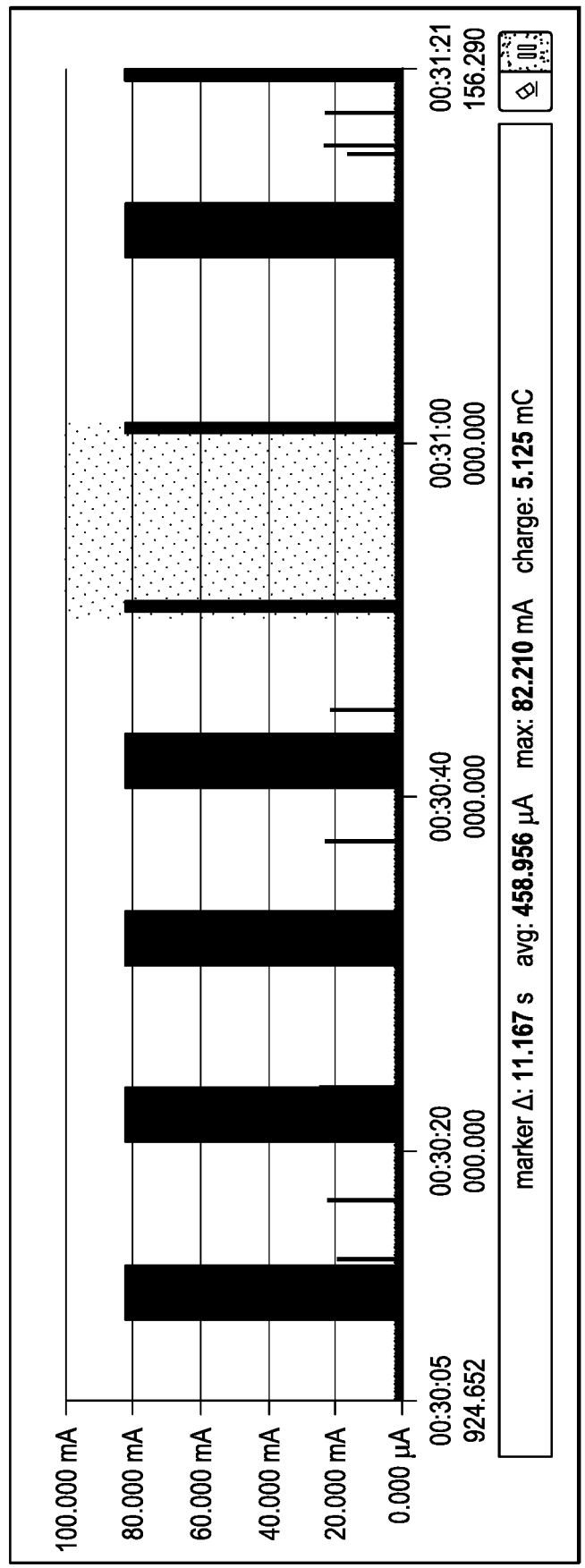

For testing, the sensor device was allowed time to buffer six readings. A custom application was created to perform the steps needed to pull the data and clear the data. FIG. 39 depicts the power usage for this process. The section highlighted covers the connection, pulling of the data, clearing the data and then the disconnection. The wider bands of red are the normal advertising intervals. Since the sensor device spent 36 seconds advertising over a one-hour period, then 99% of the time the sensor device was in a quiescent state. The reduction of power used during this period would provide the most impact to power usage and battery life.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A system comprising a gateway device, a plurality of node devices, and a plurality of sensor devices positioned within a container storage facility, wherein:
   (a) each sensor device of the plurality of sensor devices includes a sensor array, is coupled to a container that is stored at the container storage facility, is in communication with at least one node device of the plurality of node devices, and is configured to:
      (i) determine a set of container data using the sensor array, wherein the set of container data describes one or more characteristics of the container; and
      (ii) provide the set of container data to one or more node devices of the plurality of node devices;
   (b) each node device of the plurality of node devices is positioned at a different location within the container storage facility, is in communication with the gateway device, and is configured to:
      (i) determine a set of node data based on container data received from one or more sensor devices; and
      (ii) provide the set of node data to the gateway device;
   (c) the gateway device is in communication with a server through a network, and is configured to:
      (i) determine a set of gateway data based on node data received from one or more node devices; and
      (ii) provide the set of gateway data to the server; wherein the server is configured to cause a user device to display a container inventory dashboard that describes the status of a plurality of containers within the container storage facility that the plurality of sensor devices are coupled to, based on the set of gateway data; and
   wherein each sensor device of the plurality of sensor devices includes a volume sensor that is configured to determine, the presence or absence of liquid at each of a plurality of locations of the container, wherein the server is configured to, for each container of the plurality of containers:
      (a) determine a liquid volume that is stored within that container based on the set of container data indicating, at each of the plurality of locations of the container, the presence or absence of liquid; and
      (b) cause the container inventory dashboard to include the liquid volumes stored within each container of the plurality of containers.

2. The system of claim 1, wherein the sensor array includes:
   (a) a position sensor that indicates a position of the sensor device within the container storage facility;
   (b) a temperature sensor that indicates a temperature associated with the position; and
   (c) a humidity sensor that indicates a humidity associated with the position.

3. The system of claim 2, wherein the server is configured to cause the container inventory dashboard to include positions, temperature measurements, and humidity measurements for the plurality of containers.

4. The system of claim 2, wherein the server is configured to cause the container inventory dashboard to include, for a selected container from the plurality of containers, an aging timeline that includes, for the period that the selected container was stored in the container storage facility, a history of temperature, humidity, and location.

5. The system of claim 2, wherein each node device of the plurality of node devices:
   (a) comprises a node sensor array that includes a node temperature sensor that indicates a node temperature at that node's location within the storage facility, and includes a node humidity sensor that indicates a node humidity at that node's location within the storage facility; and
   (b) is configured to determine the set of node data based on container data received from one or more sensor devices, the temperature at that node's location, and the humidity at that node's location.

6. The system of claim 5, wherein the server is further configured to:
   (a) determine a refined position of the sensor device within the container storage facility based on the position of the sensor device and the node temperature and node humidity for at least one node device of the plurality of node devices; and
   (b) cause the container inventory dashboard to include refined positions for the plurality of containers.

7. The system of claim 1, wherein the server is configured to cause the container inventory dashboard to include a liquid volume that is stored within each container of the plurality of containers.

8. The system of claim 7, wherein the sensor array includes a circular electrode array adapted to fit a circular edge of the container, wherein the circular electrode array includes a plurality of electrodes distributed across its circular length, wherein each electrode of the plurality of electrodes is configured to produce a signal indicating the presence of liquid within the container at that electrode's location, and wherein the server is configured to determine the liquid volume for each container based on the output of the plurality of electrodes for that container.

9. The system of claim 7, wherein the sensor array includes a precision volume sensor adapted to fit a top side of the container, wherein the precision volume sensor is configured to:
   (a) transmit a signal through a wall of the container and a volume of air within the container to reflect off a volume of liquid in the container;
   (b) receive the reflected signal; and
   (c) produce a volume sensor measurement that indicates a time of travel between transmitting the signal and receiving the reflected signal;
   wherein the server is configured to determine the liquid volume for each container based on the volume sensor measurement.

10. The system of claim 9, wherein the precision volume sensor includes a magnetic mount that is adapted to couple the precision volume sensor to a metal hoop of the container.

11. The system of claim 7, wherein the sensor array includes a linear electrode array adapted to fit a side of the container, wherein the linear electrode array includes a plurality of electrodes distributed across its linear length, wherein each electrode of the plurality of electrodes is configured to produce a signal indicating the presence of liquid within the container at that electrode's location, and wherein the server is configured to determine the liquid volume for each container based on the output of the plurality of electrodes for that container.

12. The system of claim 1, wherein each sensor device of the plurality of sensor devices is configured to:
   (a) enter a sleep state in which at least one sensor of the sensor array is disabled, and communication with the at least one node device is disabled; and (b) exit the sleep state in response to the occurrence of an event from a set of configured events;
wherein the set of configured events includes a scheduled event that occurs based on the passage of time.

13. The system of claim 12, wherein:
(a) the sensor array includes an accelerometer that indicates movements of the container;
(b) the accelerometer is not disabled during the sleep state; and
(c) the set of configured events includes a movement event that occurs based on an indication from the accelerometer that the container has moved.

14. The system of claim 13, wherein the server is further configured to cause the container inventory dashboard to include a container motion notification in response to the movement event.

15. The system of claim 14, wherein the server is further configured to:
(a) determine, based on the set of container data and the movement event, that the sensor device has become unattached from the container; and
(b) in response, cause the container motion notification to indicate that the sensor device has become unattached from the container.

16. The system of claim 14, wherein the server is further configured to:
(a) determine, based on the set of container data and the movement event, that the container has undergone a significant change in location or orientation; and
(b) in response, cause the container motion notification to indicate that the container has undergone the significant change in location or orientation.

17. The system of claim 14, wherein the server is further configured to:
(a) determine, based on multiple sets of container data and multiple movements events, that a subset of proximately located containers have each undergone movement; and
(b) in response, cause the container motion notification to indicate that multiple proximately located containers have each undergone a change in location or orientation.

18. The system of claim 12, wherein the sensor device is configured to, when exiting the sleep state:
(a) immediately provide the set of container data to the one or more node devices as a non-transactional broadcast without confirming receipt of the set of container data; and
(b) immediately enter the sleep after completing the non-transactional broadcast.

19. The system of claim 1, wherein the sensor array includes a linear electrode array adapted to fit a side of the container, one or more accelerometers usable to determine relative positions of a plurality of electrodes of the linear electrode array, and an output device, wherein the sensor device is further configured to, when placed into an install mode:
(a) determine the relative positions of each electrode of the plurality of electrodes;
(b) as each electrode of the plurality of electrodes is coupled to the container, determine whether that electrode is within a configured threshold of an acceptable placement location on the container based on the relative position of that electrode; and
(c) where that electrode is not within the configured threshold, provide an indication via the output device that that electrode should be repositioned.

20. The system of claim 1, wherein the sensor device is further configured to:
(a) when providing a first set of container data, save a local copy of the first set of container data;
(b) when providing a second set of container data subsequent to the first set of container data, compare the second set of container data to the first set of container data to produce a minimized second set of container data that omits any values that have not significantly changed;
(c) provide the minimized second set of container data instead of the second set of container data.

21. A method comprising:
(a) positioning a gateway device at a container storage facility, wherein the gateway device is in communication with a server through a network;
(b) positioning a plurality of node devices at different locations within the container storage facility, wherein each node device of the plurality of devices is in communication with the gateway device;
(c) coupling a plurality of sensor devices to a plurality of containers stored within the container storage facility, wherein each sensor device of the plurality of sensor devices includes a sensor array and is in communication with at least one node device of the plurality of node devices, wherein the sensor array includes a linear electrode array adapted to fit a side of the container, wherein the linear electrode array includes a plurality of electrodes distributed across length;
(d) by each sensor device of the plurality of sensor devices:
(i) determining a set of container data using the sensor array, wherein the set of container data describes one or more characteristics of the container; and
(ii) providing the set of container data to one or more node devices of the plurality of node devices;
(e) by each node device of the plurality of node devices:
(i) determining a set of node data based on container data received from one or more sensor devices; and (ii) providing the set of node data to the gateway device;
(f) by the gateway device:
(i) determining a set of gateway data based on node data received from one or more node devices; and
(ii) providing the set of gateway data to the server;
(g) by the server, causing a user device to display a container inventory dashboard that describes the status of the plurality of containers within the container storage facility that the plurality of sensor devices are coupled to, based on the set of gateway data;
(h) by each electrode of the plurality of electrodes, producing a signal indicating the presence of liquid within the container at that electrode's location; and (i) by the server, determining the liquid volume for each container based on the output of the plurality of electrodes for that container.

22. The method of claim 21, further comprising, by the server, causing the container inventory dashboard to include a liquid volume that is stored within each container of the plurality of containers.

23. The method of claim 22, wherein the sensor array includes a precision volume sensor adapted to fit a top side of the container, the method further comprising: (a) by the precision volume sensor:
(i) transmitting a signal through a wall of the container and a volume of air within the container to reflect off a volume of liquid in the container;

(ii) receiving the reflected signal; and (iii) producing a volume sensor measurement that indicates a time of travel between transmitting the signal and receiving the reflected signal;
(b) by the server, determining the liquid volume for each container based on the volume sensor measurement.

24. A sensor device comprising:
(a) a housing adapted to couple the sensor device to a wall of a container;
(b) a sensor array including a volume sensor that is configured to detect a volume of liquid within the container, wherein the volume sensor includes a linear electrode array adapted to fit a side of the container, wherein the linear electrode array includes a plurality of electrodes distributed across its linear length, wherein each electrode of the plurality of electrodes is configured to produce a signal indicating the presence of liquid within the container at that electrode's location, a temperature sensor configured to detect a temperature associated with the container, and a humidity sensor configured to detect a humidity associated with the container;
(c) a communication device that is in communication with a node device; and
(d) a processor; wherein the processor is configured to:
(i) exit a sleep state in response to the occurrence of an event from a set of configured events, wherein the set of configured events includes a scheduled event that occurs based on the passage of time;
(ii) while not in the sleep state:
(A) determine a set of container data using the sensor array, wherein the set of container data describes one or more characteristics of the container including at least the volume of liquid, the temperature, and the humidity; and
(B) provide the set of container data to one or more node devices of the plurality of node devices via the communication device; and
(iii) after providing the set of container data, enter the sleep state in which at least one sensor of the sensor array and the communication device are disabled.

25. The sensor device of claim 24, wherein the volume sensor includes a circular electrode array adapted to fit a circular edge of the container, wherein the circular electrode array includes a plurality of electrodes distributed across its circular length, wherein each electrode of the plurality of electrodes is configured to produce a signal indicating the presence of liquid within the container at that electrode's location.

26. The sensor device of claim 24, wherein the volume sensor includes a precision volume sensor adapted to fit a top side of the container, wherein the precision volume sensor is configured to:
(a) transmit a signal through a wall of the container and a volume of air within the container to reflect off a volume of liquid in the container;
(b) receive the reflected signal; and
(c) produce a volume sensor measurement that indicates a time of travel between transmitting the signal and receiving the reflected signal.

* * * * *